US010369898B2

(12) United States Patent
Newman et al.

(10) Patent No.: US 10,369,898 B2
(45) Date of Patent: Aug. 6, 2019

(54) RECHARGEABLE VEHICLE THERMAL MANAGEMENT CHARGING SYSTEM

(71) Applicant: NIO USA, Inc., San Jose, CA (US)

(72) Inventors: Austin L. Newman, San Jose, CA (US); Thomas P. Jensen, Eagle, ID (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/408,079

(22) Filed: Jan. 17, 2017

(65) Prior Publication Data

US 2018/0201152 A1 Jul. 19, 2018

(51) Int. Cl.
H02J 7/00 (2006.01)
B60L 11/18 (2006.01)
H02J 7/35 (2006.01)
B60L 53/14 (2019.01)
B60L 53/12 (2019.01)
B60L 58/26 (2019.01)

(52) U.S. Cl.
CPC ........... B60L 11/1874 (2013.01); B60L 53/12 (2019.02); B60L 53/14 (2019.02); B60L 58/26 (2019.02); H02J 7/35 (2013.01); Y02T 10/7005 (2013.01); Y02T 10/705 (2013.01); Y02T 10/7072 (2013.01); Y02T 90/122 (2013.01); Y02T 90/14 (2013.01)

(58) Field of Classification Search
CPC ...... H01F 38/14; Y02T 90/122; B60L 11/182; Y02E 60/12
USPC ......................................................... 320/108
See application file for complete search history.

(56) References Cited

U.S. PATENT DOCUMENTS

| 5,594,315 | A | * | 1/1997 | Ramos | ................... B60L 11/182 320/108 |
| 5,684,380 | A | * | 11/1997 | Woody | ................... B60L 11/182 320/108 |
| 6,396,241 | B1 | * | 5/2002 | Ramos | ................ B60L 11/1816 174/47 |
| 8,336,319 | B2 | | 12/2012 | Johnston et al. | |
| 8,620,506 | B2 | | 12/2013 | Kummer et al. | |
| 8,899,492 | B2 | | 12/2014 | Kelty et al. | |
| 9,631,872 | B2 | | 4/2017 | Lombardo et al. | |
| 9,707,823 | B2 | | 7/2017 | Feuerecker et al. | |
| 9,758,012 | B2 | | 9/2017 | Johnston | |
| 2002/0094910 | A1 | * | 7/2002 | Endo | ........................ B60K 6/48 477/97 |
| 2005/0142250 | A1 | * | 6/2005 | Garwood | ................. A23B 4/00 426/35 |
| 2010/0089669 | A1 | * | 4/2010 | Taguchi | ............. B60H 1/00257 180/65.1 |
| 2012/0009455 | A1 | | 1/2012 | Yoon | |
| 2012/0043943 | A1 | * | 2/2012 | Dyer | ................... B60L 11/1809 320/137 |
| 2012/0241129 | A1 | | 9/2012 | Kohl et al. | |

(Continued)

OTHER PUBLICATIONS

Official Action for U.S. Appl. No. 15/364,891, dated Oct. 19, 2018, 6 pages, Restriction Requirement.

(Continued)

Primary Examiner — Arun C Williams
(74) Attorney, Agent, or Firm — Sheridan Ross P.C.

(57) ABSTRACT

Systems of an electrical vehicle and the operations thereof are provided that control an operating temperature of an on board battery pack using an external thermal management system.

14 Claims, 20 Drawing Sheets

(56) References Cited

U.S. PATENT DOCUMENTS

| | | |
|---|---|---|
| 2012/0247753 A1 | 10/2012 | Bachmann |
| 2012/0316711 A1* | 12/2012 | Christian .............. H01L 23/473 |
| | | 701/22 |
| 2014/0012447 A1 | 1/2014 | Gao et al. |
| 2014/0292260 A1* | 10/2014 | Dyer .................... H02J 7/0027 |
| | | 320/107 |
| 2014/0370353 A1 | 12/2014 | Oshiba et al. |
| 2015/0054460 A1* | 2/2015 | Epstein ................ B60L 11/187 |
| | | 320/109 |
| 2015/0135742 A1 | 5/2015 | Rousseau et al. |
| 2015/0306974 A1* | 10/2015 | Mardall .............. B60L 11/1874 |
| | | 320/150 |
| 2016/0013510 A1* | 1/2016 | Powell .............. H01M 10/4207 |
| | | 320/108 |
| 2016/0226111 A1 | 8/2016 | Blume et al. |
| 2017/0015397 A1 | 1/2017 | Mitchell et al. |
| 2018/0034122 A1 | 2/2018 | Newman |
| 2018/0048037 A1 | 2/2018 | Newman |
| 2018/0048039 A1 | 2/2018 | Newman et al. |

OTHER PUBLICATIONS

U.S. Appl. No. 15/686,513, filed Aug. 25, 2017, Smith et al.
U.S. Appl. No. 15/940,638, filed Mar. 29, 2018, Smith et al.
U.S. Appl. No. 15/983,289, filed May 18, 2018, Rajaie et al.
Official Action for U.S. Appl. No. 15/364,891, dated Jan. 8, 2019, 14 pages.

* cited by examiner

RECHARGEABLE VEHICLE THERMAL MANAGEMENT CHARGING SYSTEM

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

DETAILED DESCRIPTION

Embodiments of the present disclosure will be described in connection with a vehicle, and in accordance with one exemplary embodiment an electric vehicle and/or hybrid-electric vehicle and associated systems. The vehicle has both an internal and external thermal management unit to control the temperature of an on board energy storage unit, particularly during charging. The thermal management units can beneficially maintain operating temperatures of the energy storage unit with a predetermined range, thereby not only increasing energy storage unit operating life but also reducing a likelihood of fires due to thermal runaway of the energy storage unit.

With attention to FIGS. 1-11, embodiments of the electric vehicle system 10 and method of use are depicted.

Figure 1:
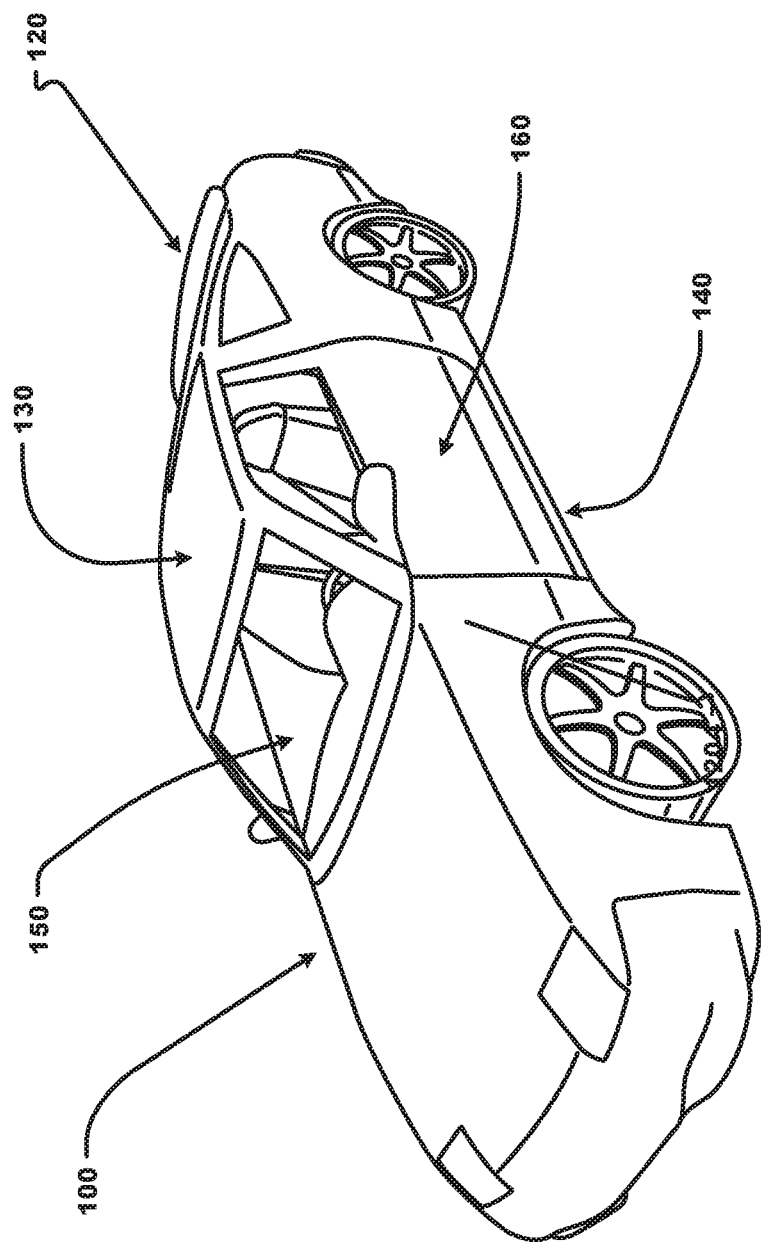
FIG. 1 shows a vehicle in accordance with embodiments of the present disclosure.

Referring to FIG. 1, the electric vehicle system comprises electric vehicle 100. The electric vehicle 100 comprises vehicle front 110, vehicle aft 120, vehicle roof 130, vehicle side 160, vehicle undercarriage 140 and vehicle interior 150. Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like. In any event, the vehicle 100 may include a frame and one or more body panels mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components.

Figure 2:
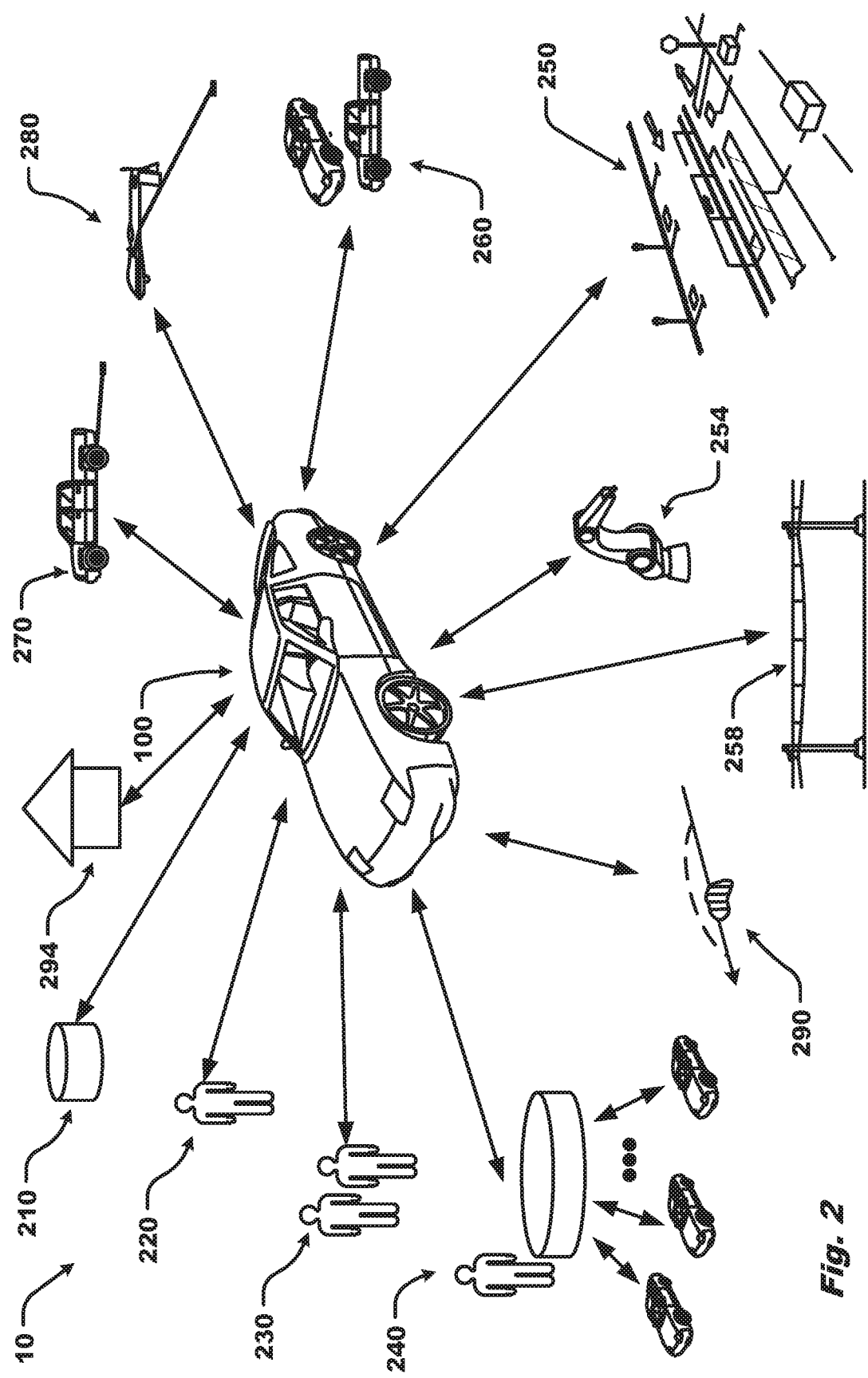
FIG. 2 shows a vehicle in an environment in accordance with embodiments of the present disclosure.

Referring to FIG. 2, the vehicle 100 is depicted in a plurality of exemplary environments. The vehicle 100 may operate in any one or more of the depicted environments in any combination. Other embodiments are possible but are not depicted in FIG. 2. Generally, the vehicle 100 may operate in environments which enable charging of the vehicle 100 and/or operation of the vehicle 100. More specifically, the vehicle 100 may receive a charge via one or more means comprising emergency charging vehicle system 270, aerial vehicle charging system 280, roadway system 250, robotic charging system 254, overhead charging system 258, and operator-based charging system 294 (such as a home- or garage-based charging unit (not shown)). The vehicle 100 may interact and/or operate in an environment comprising one or more other roadway vehicles 260. The vehicle 100 may engage with elements within the vehicle 100 comprising vehicle driver 220, vehicle passengers 220 and vehicle database 210. In one embodiment, vehicle database 210 does not physically reside in the vehicle 100 but is instead accessed remotely, e.g. by wireless communication, and resides in another location such as a residence or business location. Vehicle 100 may operate autonomously and/or semi-autonomously in an autonomous environment 290 (here, depicted as a roadway environment presenting a roadway obstacle of which the vehicle 100 autonomously identifies and steers the vehicle 100 clear of the obstacle). Furthermore, the vehicle 100 may engage with a remote operator system 240, which may provide fleet management instructions or control.

Figure 3A:
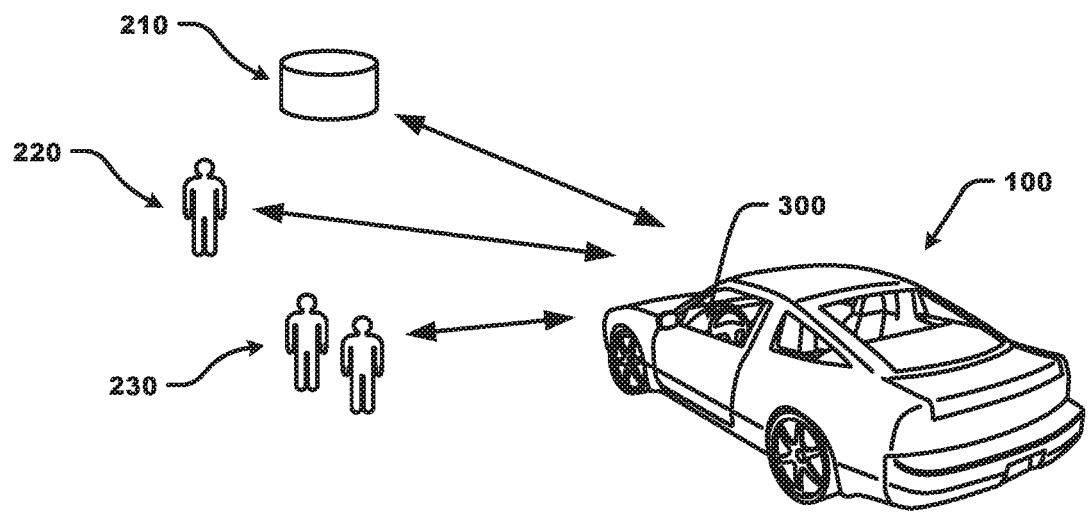
FIG. 3A shows a vehicle in a user environment in accordance with embodiments of the present disclosure.

FIG. 3A depicts the vehicle 100 in a user environment comprising vehicle database 210, vehicle driver 220 and vehicle passengers 230. Vehicle 100 further comprises vehicle instrument panel 300 to facilitate or enable interactions with one or more of vehicle database 210, vehicle driver 220 and vehicle passengers 230. In one embodiment, driver 210 interacts with instrument panel 300 to query database 210 so as to locate available charging options and to consider or weigh associated terms and conditions of the charging options. Once a charging option is selected, driver 210 may engage or operate a manual control device (e.g., a joystick) to position a vehicle charging receiver panel so as to receive a charge.

Figure 3B:
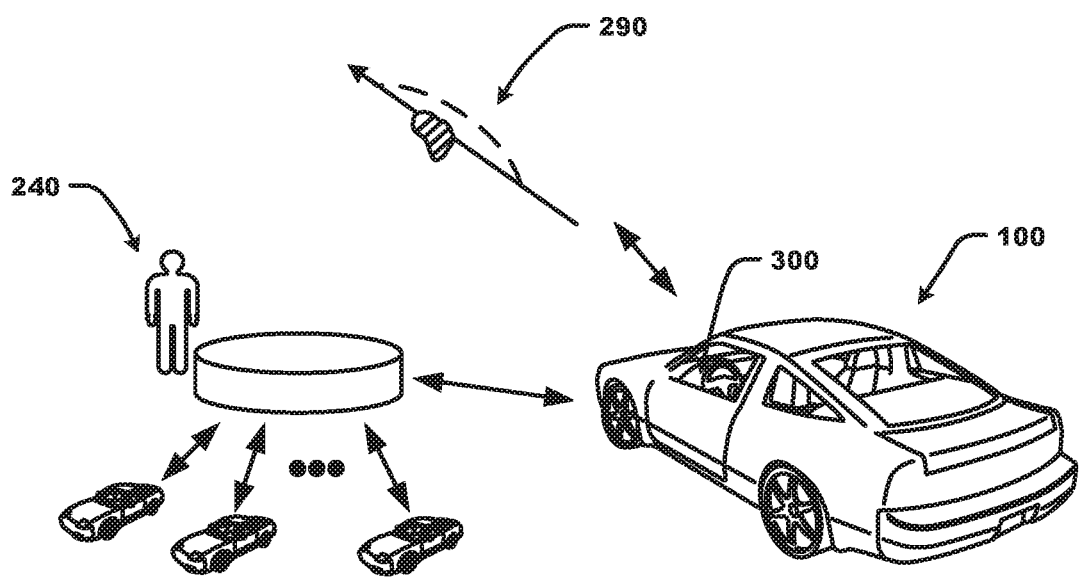
FIG. 3B shows a vehicle in a fleet management and automated operation environment in accordance with embodiments of the present disclosure.

FIG. 3B depicts the vehicle 100 in a user environment comprising a remote operator system 240 and an autonomous driving environment 290. In the remote operator system 240 environment, a fleet of electric vehicles 100 (or mixture of electric and non-electric vehicles) is managed and/or controlled remotely. The remote operator system 240 may comprise a database comprising operational data, such as fleet-wide operational data. In another example, the vehicle 100 may operate in an autonomous driving environment 290 wherein the vehicle 100 is operated with some degree of autonomy, ranging from complete autonomous operation to semi-automation wherein only specific driving parameters (e.g., speed control or obstacle avoidance) are maintained or controlled autonomously. In FIG. 3B, autonomous driving environment 290 depicts an oil slick roadway hazard that triggers that triggers the vehicle 100, while in an automated obstacle avoidance mode, to automatically steer around the roadway hazard.

Figure 3C:
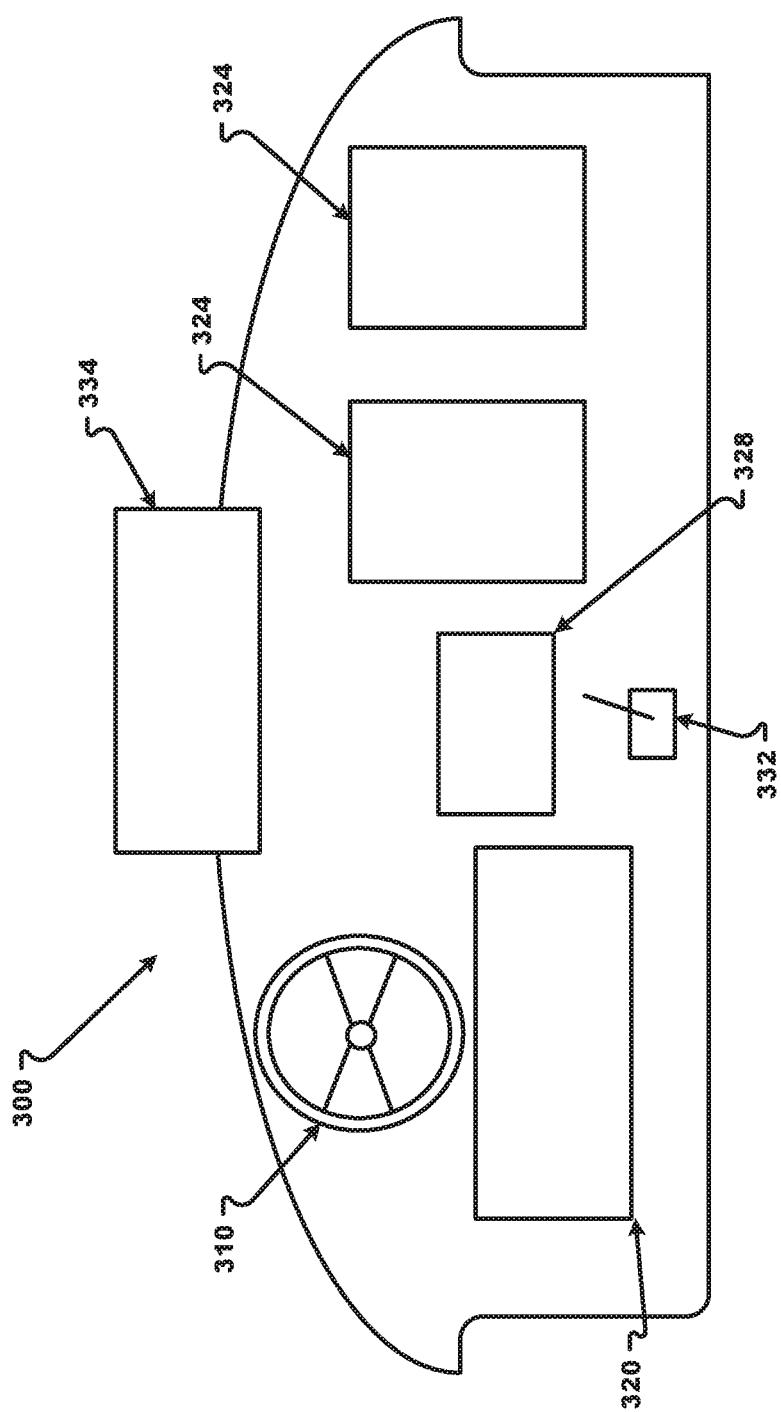
FIG. 3C shows an embodiment of the instrument panel of the vehicle according to one embodiment of the present disclosure.

FIG. 3C shows one embodiment of the vehicle instrument panel 300 of vehicle 100. Instrument panel 300 of vehicle 100 comprises steering wheel 310, vehicle operational display 320 (which would provide basic driving data such as speed), one or more auxiliary displays 324 (which may display, e.g., entertainment applications such as music or radio selections), heads-up display 334 (which may provide, e.g., guidance information such as route to destination, or obstacle warning information to warn of a potential collision, or some or all primary vehicle operational data such as speed), power management display 328 (which may provide, e.g., data as to electric power levels of vehicle 100), and charging manual controller 332 (which provides a physical input, e.g. a joystick, to manual maneuver, e.g., a vehicle charging plate to a desired separation distance). One or more of displays of instrument panel 300 may be touchscreen displays. One or more displays of instrument panel 300 may be mobile devices and/or applications residing on a mobile device such as a smart phone.

Figure 4:
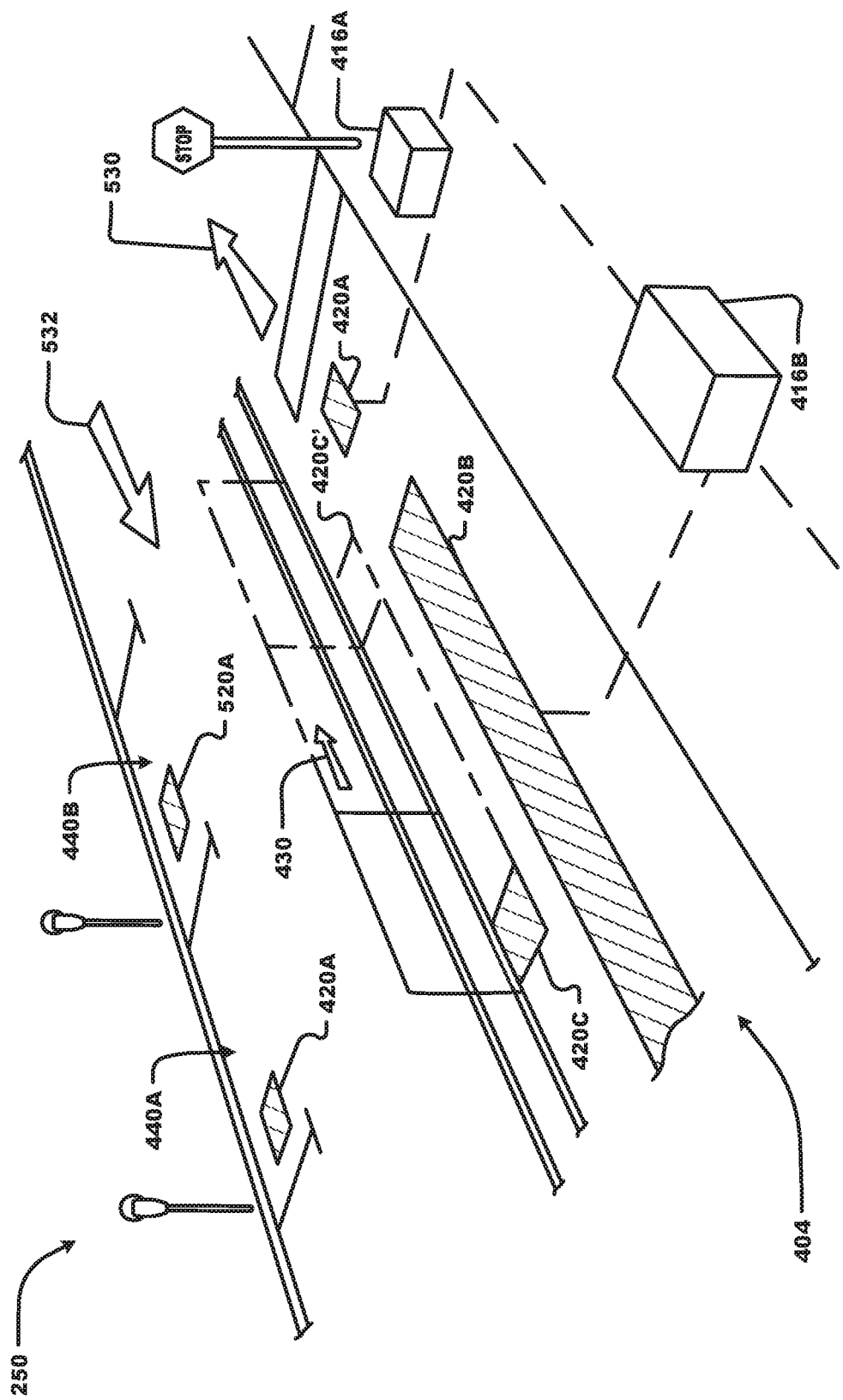
FIG. 4 shows charging areas associated with an environment in accordance with embodiments of the present disclosure.

FIG. 4 depicts a charging environment of a roadway charging system 250. The charging area may be in the roadway 404, on the roadway 404, or otherwise adjacent to the roadway 404, and/or combinations thereof. This static charging area 420B may allow a charge to be transferred even while the electrical vehicle 100 is moving. For example, the static charging area 420B may include a charging transmitter (e.g., conductor, etc.) that provides a transfer of energy when in a suitable range of a receiving unit (e.g., an inductor pick up, etc.). In this example, the receiving unit may be a part of the charging panel associated with the electrical vehicle 100.

The static charging areas 420A, 420B may be positioned a static area such as a designated spot, pad, parking space 440A, 440B, traffic controlled space (e.g., an area adjacent to a stop sign, traffic light, gate, etc.), portion of a building, portion of a structure, etc., and/or combinations thereof. Some static charging areas may require that the electric vehicle 100 is stationary before a charge, or electrical energy transfer, is initiated. The charging of vehicle 100 may occur by any of several means comprising a plug or other protruding feature. The power source 416A, 416B may include a receptacle or other receiving feature, and/or vice versa.

The charging area may be a moving charging area 420C. Moving charging areas 420C may include charging areas associated with one or more portions of a vehicle, a robotic charging device, a tracked charging device, a rail charging device, etc., and/or combinations thereof. In a moving charging area 420C, the electrical vehicle 100 may be configured to receive a charge, via a charging panel, while the vehicle 100 is moving and/or while the vehicle 100 is stationary. In some embodiments, the electrical vehicle 100 may synchronize to move at the same speed, acceleration, and/or path as the moving charging area 420C. In one embodiment, the moving charging area 420C may synchronize to move at the same speed, acceleration, and/or path as the electrical vehicle 100. In any event, the synchronization may be based on an exchange of information communicated across a communications channel between the electric vehicle 100 and the charging area 420C. Additionally or alternatively, the synchronization may be based on information associated with a movement of the electric vehicle 100 and/or the moving charging area 420C. In some embodiments, the moving charging area 420C may be configured to move along a direction or path 432 from an origin position to a destination position 420C'.

In some embodiments, a transformer may be included to convert a power setting associated with a main power supply to a power supply used by the charging areas 420A-C. For example, the transformer may increase or decrease a voltage associated with power supplied via one or more power transmission lines.

Figure 5:
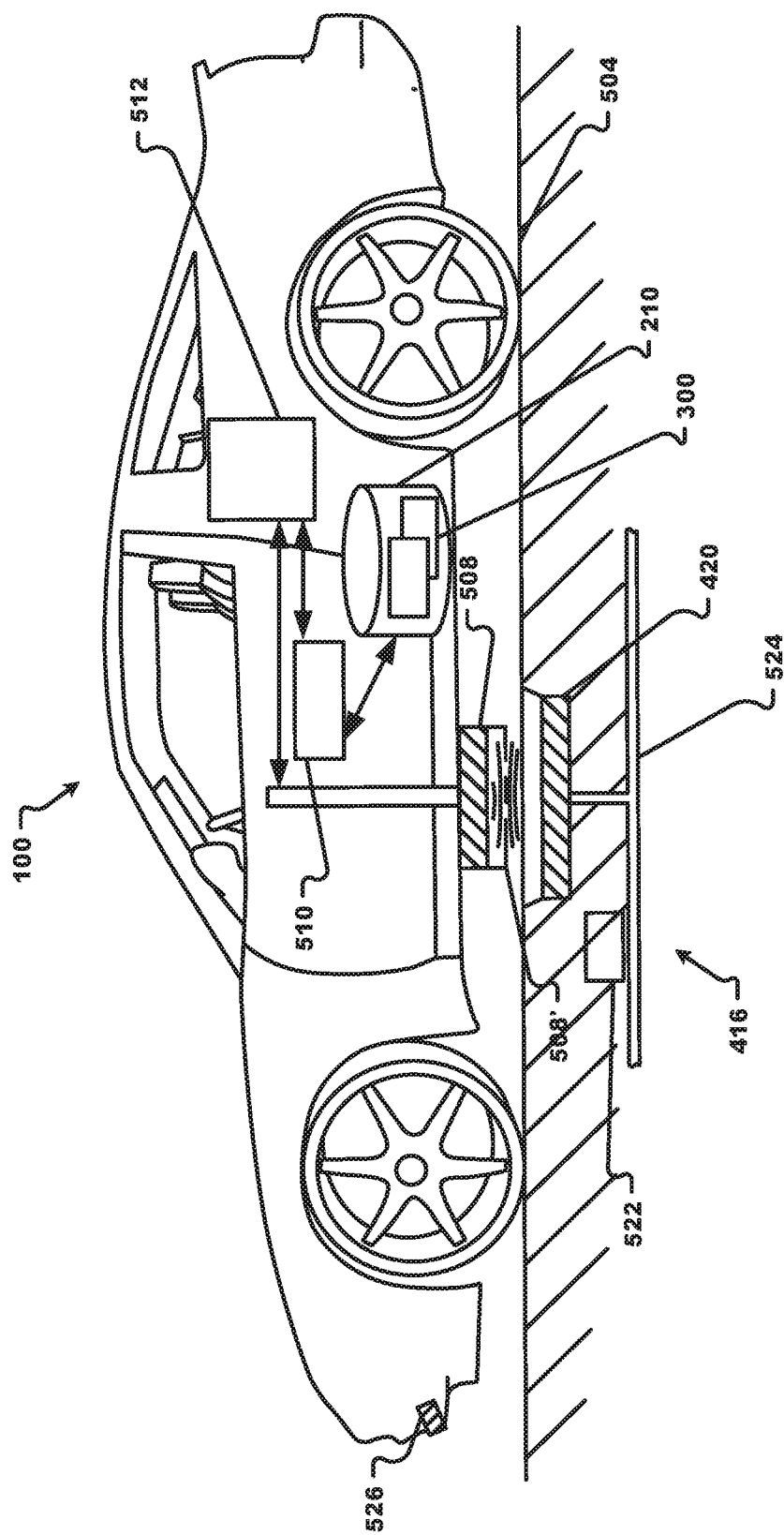
FIG. 5 shows a vehicle in a roadway charging environment in accordance with embodiments of the present disclosure.

Referring to FIG. 5, a vehicle 100 is shown in a charging environment in accordance with embodiments of the present disclosure. The system 10 comprises a vehicle 100, an electrical storage unit 512, an external power source 416 able to provide a charge to the vehicle 100, a charging panel 508 mounted on the vehicle 100 and in electrical communication with the electrical storage unit 512, and a vehicle charging panel controller 510 to control deployment of the vehicle charging panel 508. The charging panel controller 510 may determine if the electrical storage unit requires charging and if conditions allow for deployment of a charging panel. The vehicle charging panel 508 may operate in at least a retracted state and a deployed state (508 and 508' as shown is FIG. 5), and is movable by way of an armature.

The power source 416 may include at least one electrical transmission line 524 and at least one power transmitter or charging area 420. During a charge, the charging panel 508 may serve to transfer energy from the power source 416 to at least one energy storage unit 512 (e.g., battery, capacitor, power cell, etc.) of the electric vehicle 100.

Figure 6:
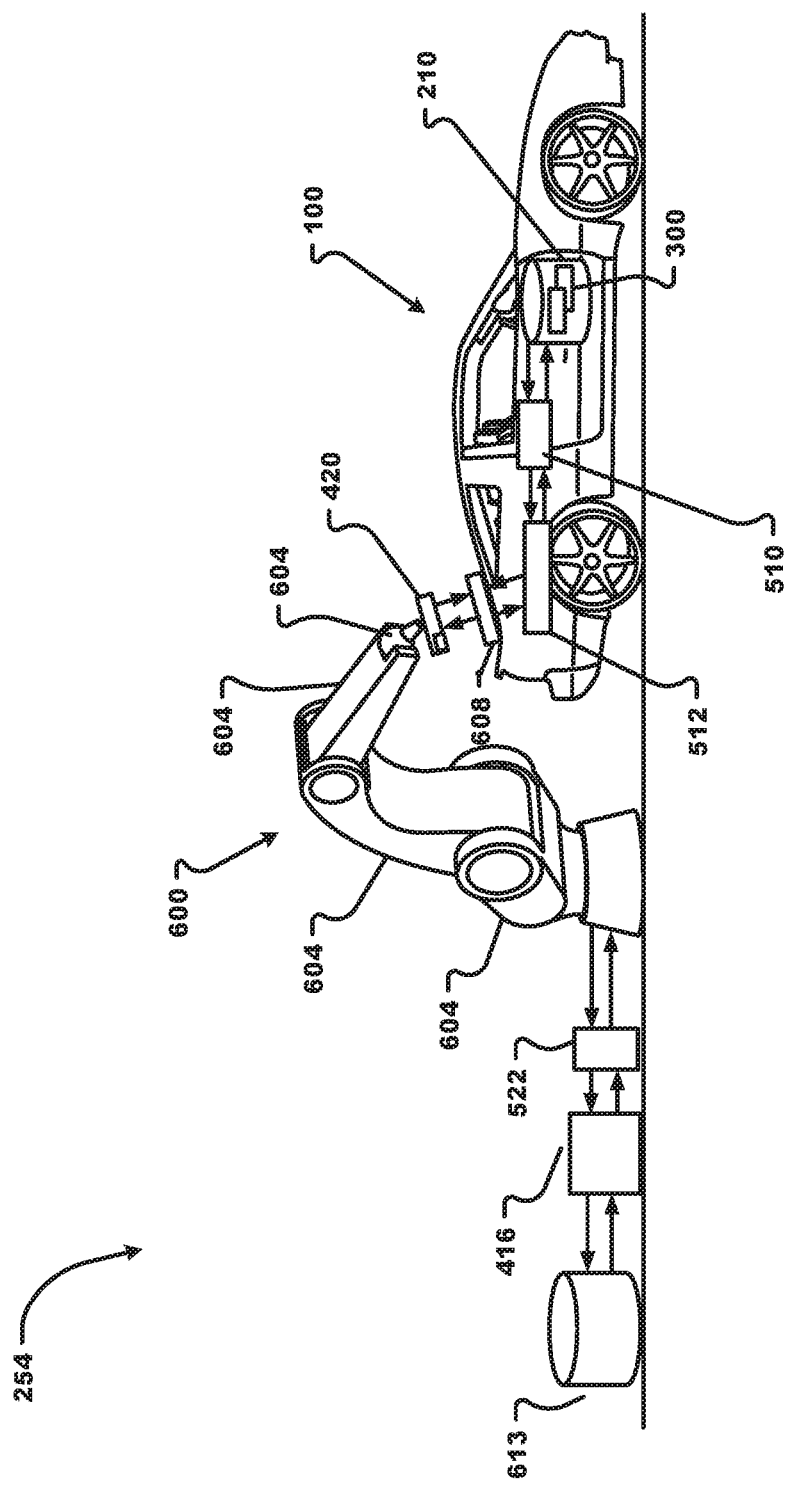
FIG. 6 shows a vehicle in a robotic charging station environment in accordance with another embodiment of the present disclosure.

FIG. 6 shows a vehicle 100 in a charging station environment 254 or operator-based charging system 294 in accordance with another embodiment of the present disclosure. Generally, in this embodiment of the disclosure, charging occurs from a robotic unit 600.

Robotic charging unit 600 comprises one or more robotic unit arms 604, at least one robotic unit arm 604 interconnected with charging plate 520. The one or more robotic unit arms 604 maneuver charging plate 420 relative to charging panel 608 of vehicle 100. Charging plate 420 is positioned to a desired or selectable separation distance, as assisted by a separation distance sensor disposed on charging plate 420. Charging plate 420 may remain at a finite separation distance from charging panel 608, or may directly contact charging panel (i.e. such that separation distance is zero). Charging may be by induction. In alternative embodiments, separation distance sensor is alternatively or additionally disposed on robotic arm 604. Vehicle 100 receives charging via charging panel 608 which in turn charges energy storage unit 512. Charging panel controller 510 is in communication with energy storage unit 512, charging panel 608, vehicle database 300, charge provider controller 522, and/or any one of elements of instrument panel 300.

Robotic unit further comprises, is in communication with and/or is interconnected with charge provider controller 522, power source 416 and a robotic unit database. Power source 416 supplies power, such as electrical power, to charge plate 420 to enable charging of vehicle 100 via charging panel 508. Controller 522 manoeuvers or operates robotic unit 504, either directly and/or completely or with assistance from a remote user, such as a driver or passenger in vehicle 100 by way of, in one embodiment, charging manual controller 332.

As will be appreciated, charging is not necessarily automated. Charging can be provided by a manually deployed charging system (not shown) that plugs into an outlet in the vehicle 100 or wirelessly charges the vehicle 100 via a manually positioned charging plate 420 providing a charge to one or more charging panels 508.

Figure 7:
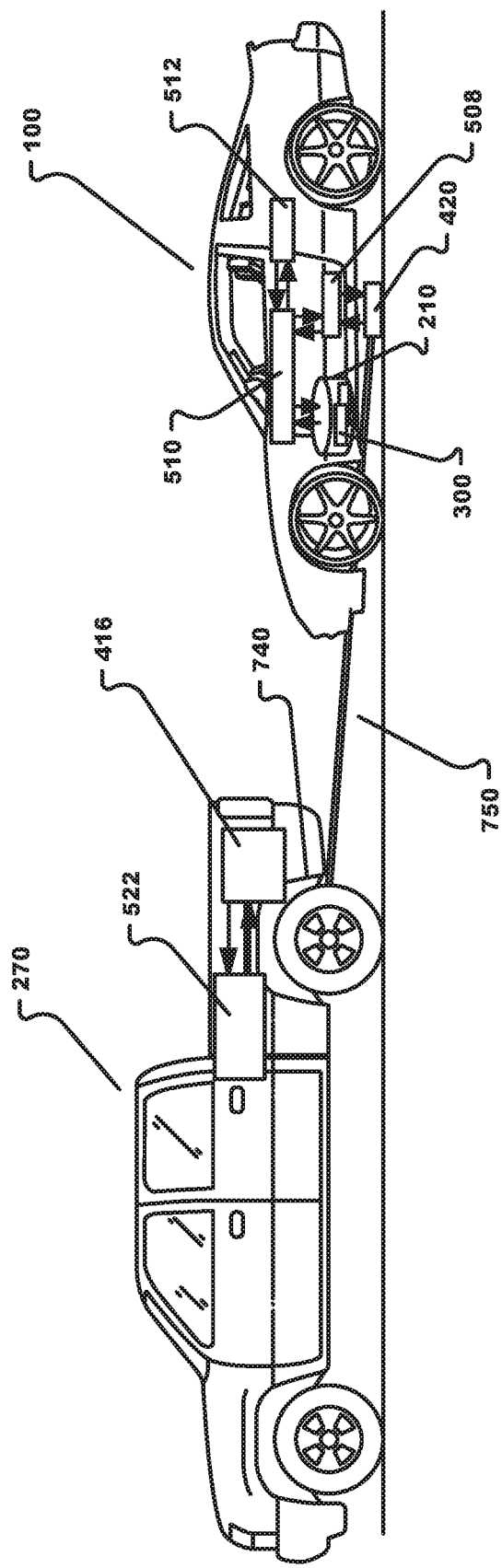
FIG. 7 shows a vehicle in an emergency charging environment in accordance with embodiments of the present disclosure.

FIG. 7 is an embodiment of a vehicle emergency charging system comprising an emergency charging vehicle 270 and charge receiver vehicle 100 is disclosed. The emergency charging vehicle 270 is a road vehicle, such as a pick-up truck, as shown in FIG. 7. The emergency charging vehicle 270 is configured to provide a charge to a charge receiver vehicle 100, such as an automobile. The emergency charging vehicle 270 comprises an energy source i.e. a charging power source 416 and a charge provider controller 522 in communication with the charging power source 416. The emergency charging vehicle 270 provides a towed and/or articulated charger plate 420, as connected to the emergency charging vehicle 270 by connector 850. The connector 850 may comprise a chain, rope, rigid or semi-rigid tow bar or any means to position charger plate 420 near the charging panel 508 of vehicle 100. Charge or power output of charging power source 416 is provided or transmitted to charger plate 420 by way of charging cable or wire 840. In one embodiment, the charging cable 840 is non-structural, that is, it provides little or no structural support to the connection between emergency charging vehicle 270 and charging panel 508. Charging panel 508 (of vehicle 100) receives power from charger plate 420. Charger plate 420 and charging panel 508 may be in direct physical contact or not in direct physical contact, but must be at or below a threshold separation distance to enable charging, such as by induction. Charger plate 420 may comprise wheels or rollers so as to roll along roadway surface. Charger plate 420 may also not contact the ground surface and instead be suspended above the ground; such a configuration may be termed a "flying" configuration. In the flying configuration, charger plate may form an aerodynamic surface to, for example, facilitate stability and control of the positioning of the charging plate 420. Energy transfer or charging from the charger plate 420 to the charge receiver panel 508 is through inductive charging (i.e. use of an EM field to transfer energy between two objects). The charging panel 508 provides received power to energy storage unit 512 directly or by way of charging panel controller 510. In one embodiment, the receipt and/or control of the energy provided via the charging panel 508 is provided by charging panel controller 510.

Charging panel controller 510 may be located anywhere on charge receiver vehicle 100, to include, for example, the roof, side panel, trunk, hood, front or rear bumper and wheel hub of charge receiver 100 vehicle. In some embodiments, charging panel 508 may be deployable, i.e. may extend or deploy only when charging is needed. For example, charging panel 508 may typically stow flush with the lower plane of vehicle 100 and extend when required for charging. Similarly, charger plate 420 may, in one embodiment, not be connected to the lower rear of the emergency charging vehicle 270 by way of connector 850 and may instead be mounted on the emergency charging vehicle 270, to include, for example, the roof, side panel, trunk, hood, front or rear bumper and wheel hub of emergency charging vehicle 270. Connector 850 may be configured to maneuver connector plate 420 to any position on emergency charging vehicle 270 so as to enable charging. Control of the charging and/or positioning of the charging plate may be manual, automatic or semi-automatic; said control may be performed through a GUI engaged by driver or occupant of receiving vehicle and/or driver or occupant of charging vehicle.

Figure 8:
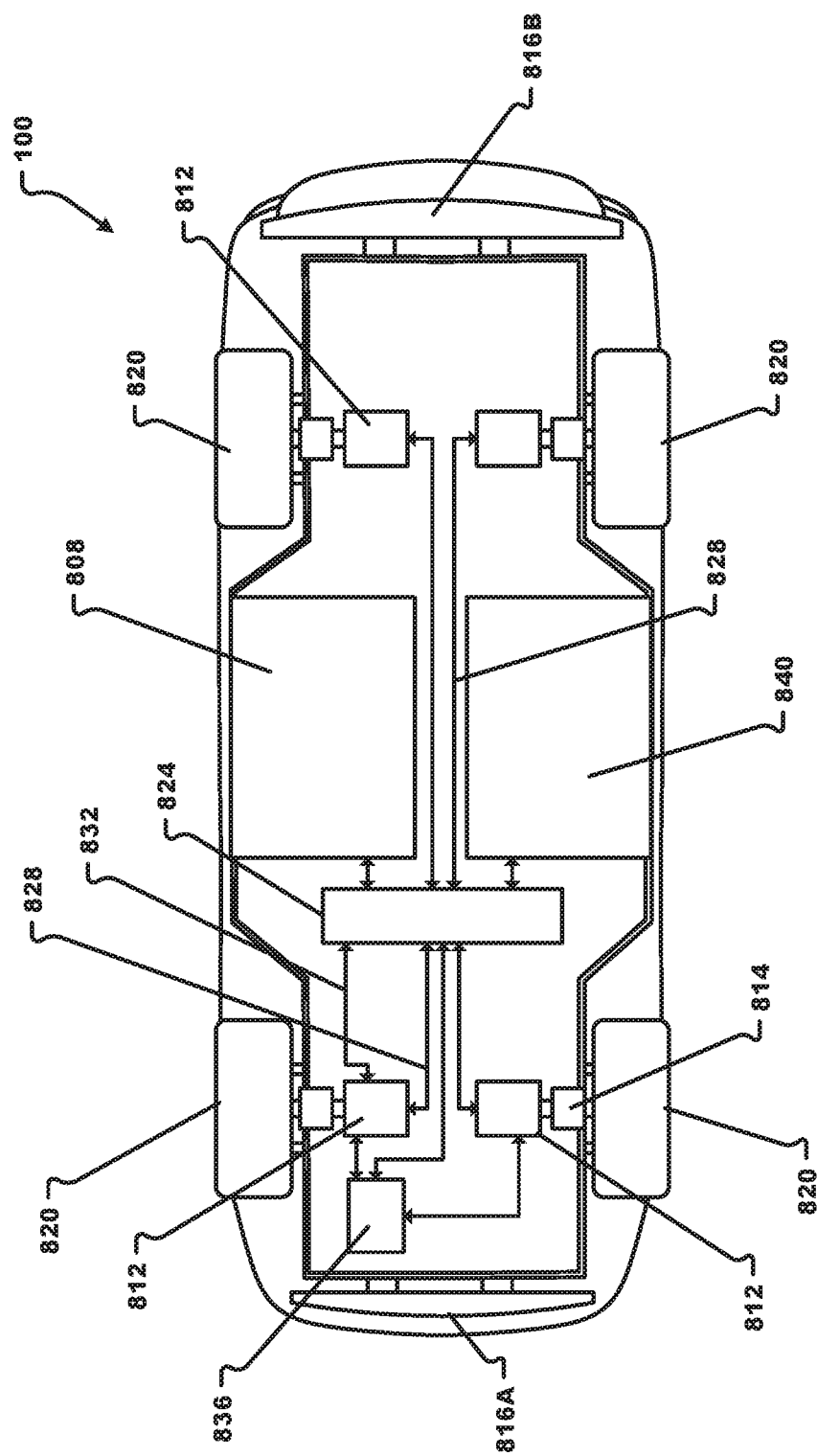
FIG. 8 is a perspective view of a vehicle in accordance with embodiments of the present disclosure.

Referring now to FIG. 8, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame of the vehicle 100. The frame may comprise a separate frame and body construction (i.e., body-on-frame construction), a unitary frame and body construction (i.e., a unibody construction), or any other construction defining the structure of the vehicle 100. The frame may comprise one or more surfaces, connections, protrusions, cavities, mounting points, tabs, slots, or other features that are configured to receive other components that make up the vehicle 100. For example, the body panels, powertrain subsystem, controls systems, interior components, communications subsystem, power source, motors, engines, controllers, user interfaces, interiors exterior components, bumpers, sensors, etc., and safety subsystem may interconnect with, or attach to, the frame of the vehicle 100.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 812 of the vehicle 100. The electric motors 812 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 820 that are driven by the one or more electric motors 812 and motor controllers 814. In some cases, the vehicle 100 may include an electric motor 812 configured to provide a driving force for each drive wheel 820. In other cases, a single electric motor 812 may be configured to share an output force between two or more drive wheels 1320 via one or more power transmission components. It is an aspect of the present disclosure that the powertrain includes one or more power transmission components, motor controllers 814, and/or power controllers that can provide a controlled output of power to one or more of the drive wheels 820 of the vehicle 100. The power transmission components, power controllers, or motor controllers 814 may be controlled by at least one other vehicle controller described herein.

As provided above, the powertrain of the vehicle 100 may include a power source 808 to provide drive power, system and/or subsystem power, accessory power, etc. While described herein as a single power source 808 for sake of clarity, embodiments of the present disclosure are not so limited. For example, it should be appreciated that independent, different, or separate power sources 808 may provide power to various systems of the vehicle 100. For instance, a drive power source may be configured to provide the power for the one or more electric motors 812 of the vehicle 100, while a system power source may be configured to provide the power for one or more other systems and/or subsystems of the vehicle 100. Other power sources may include an accessory power source, a backup power source, a critical system power source, and/or other separate power sources.

Figure 12:
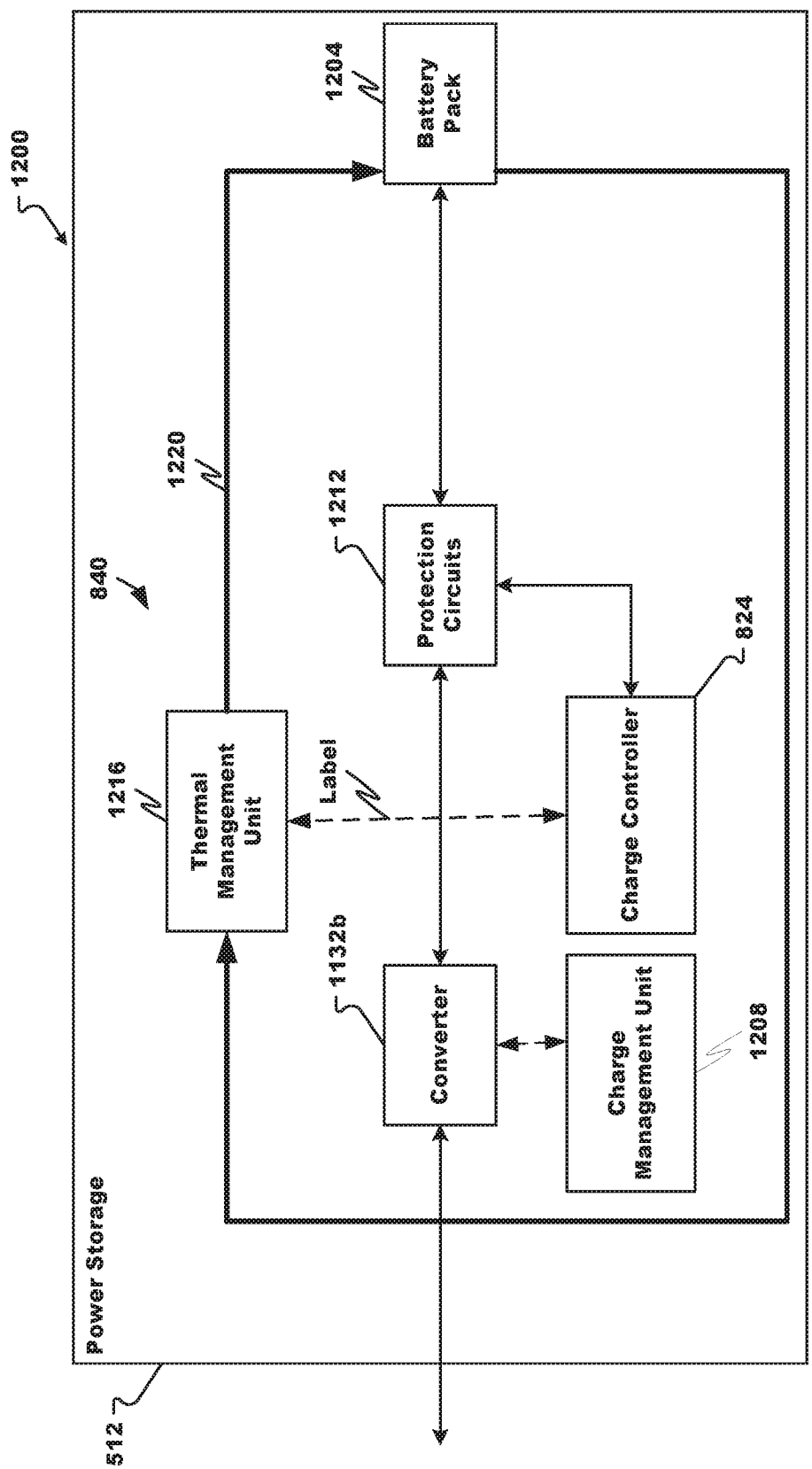
FIG. 12 is a block diagram of an embodiment of power storage associated with the electrical system of the vehicle.

With reference to FIGS. 8 and 12, the power system of the vehicle 100 can include a thermal management system 840 to control a temperature of the energy storage unit 512. As will be appreciated, energy storage unit life is dependent on energy storage unit temperature. On the one hand, energy storage unit power decreases with decreasing temperature due to increasing battery pack resistance, and energy storage unit capacity decreases with decreasing temperature, and, on the other hand, energy storage unit overheating can decrease energy storage unit life or even cause energy storage unit failure, possibly resulting in an explosion or fire. Accordingly, operating the energy storage unit within a defined temperature range can prolong energy storage unit operating life, improve energy storage unit performance, and increase energy storage unit safety. The thermal management system 840 attempts to maintain the operation of the energy storage unit within the defined temperature range using a thermal management unit 1216 (which typically includes one or more heat exchangers to add heat to or remove heat from a thermal management fluid and a pressurizing source such as a fan or pump) and fluid recycle loop 1220 (for the thermal management fluid). Examples of thermal management systems 840 include one or more of ambient air flow through the energy storage unit cells, batteries, or modules, pressurized air flow through the energy storage unit cells, batteries, or modules using a fan, air flow through the energy storage unit cells, batteries, or modules using a vehicle heater or evaporator core, a pressurized liquid passed through a liquid/ambient air heat exchanger and thereafter passed through the energy storage unit cells, batteries or modules, and a pressurized liquid passed through one or more liquid/liquid heat exchangers and thereafter passed through the energy storage unit cells, batteries or modules. In the latter example, a liquid vehicle engine coolant is used in a first liquid/liquid heat exchanger or electric heater to heat the liquid passed through the energy storage unit cells, batteries or modules or an air conditioning refrigerant is used in a second liquid/liquid heat exchanger to cool the liquid passed through the energy storage unit cells batteries, or modules. A valve can direct the liquid through the first or second liquid/liquid heat exchanger depending on whether the energy storage unit temperature is to be increased or decreased.

The power source 808 may include a charge controller 824 that may be configured to determine charge levels of the power source 808, control a rate at which charge is drawn from the power source 808, control a rate at which charge is added to the power source 808, and/or monitor a health of the power source 808 (e.g., one or more cells, portions, etc.). As will be appreciated, charging rate should be controlled to avoid overheating the energy storage unit 512 and prolong the useful life of the energy storage unit 512. Chargers commonly provide a DC charging voltage from an AC source whether from a common socket outlet or a purpose built DC charging station. The charge controller 824 controls the charge and protects the battery pack from over-voltage, over-current and over-temperature. The power level in charging can be any of Level 1, Level 2, or Level 3.

Vehicle chargers are normally mounted inside the vehicle. This is because the vehicle may be used a long way from home, further than the range possible from a single battery pack charge. For this reason, the vehicles typically carry the charger with them on board the vehicle. Charging can be carried out at home from a standard domestic electricity socket outlet but the available power is very low and charging takes a long time, possibly ten hours or more depending on the size of the battery pack. Since charging is usually carried out overnight this is not necessarily a problem, but it could be if the vehicle is away from its home base. Such low power charging is normally used in an emergency and most vehicles are fitted with a higher power charging option which can be used in commercial locations or with a higher power domestic installation.

In some embodiments, the charge controller 824 or the power source 808 may include a communication interface. The communication interface can allow the charge controller 824 to report a state of the power source 808 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers of the vehicle 100 or a communication device that is separate and/or apart from the vehicle 100.

The powertrain includes one or more power distribution systems configured to transmit power from the power source 808 to one or more electric motors 812 in the vehicle 100. The power distribution system may include electrical interconnections 828 in the form of cables, wires, traces, wireless power transmission systems, etc., and/or combinations thereof. It is an aspect of the present disclosure that the vehicle 100 include one or more redundant electrical interconnections 832 of the power distribution system. The redundant electrical interconnections 832 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 832 is being used and/or damage has occurred to a particular area of the vehicle electrical system. In any event, the one or more redundant electrical interconnections 832 may be configured along completely different routes than the electrical interconnections 828 and/or include different modes of failure than the electrical interconnections 828 to, among other things, prevent a total interruption power distribution in the event of a failure.

In some embodiments, the power distribution system may include an energy recovery system 836. This energy recovery system 836, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 836, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 808. For example, the recovered electrical energy may be used to charge the power source 808 of the vehicle 100.

The vehicle 100 may include one or more safety systems. Vehicle safety systems can include a variety of mechanical and/or electrical components including, but in no way limited to, low impact or energy-absorbing bumpers, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 9:
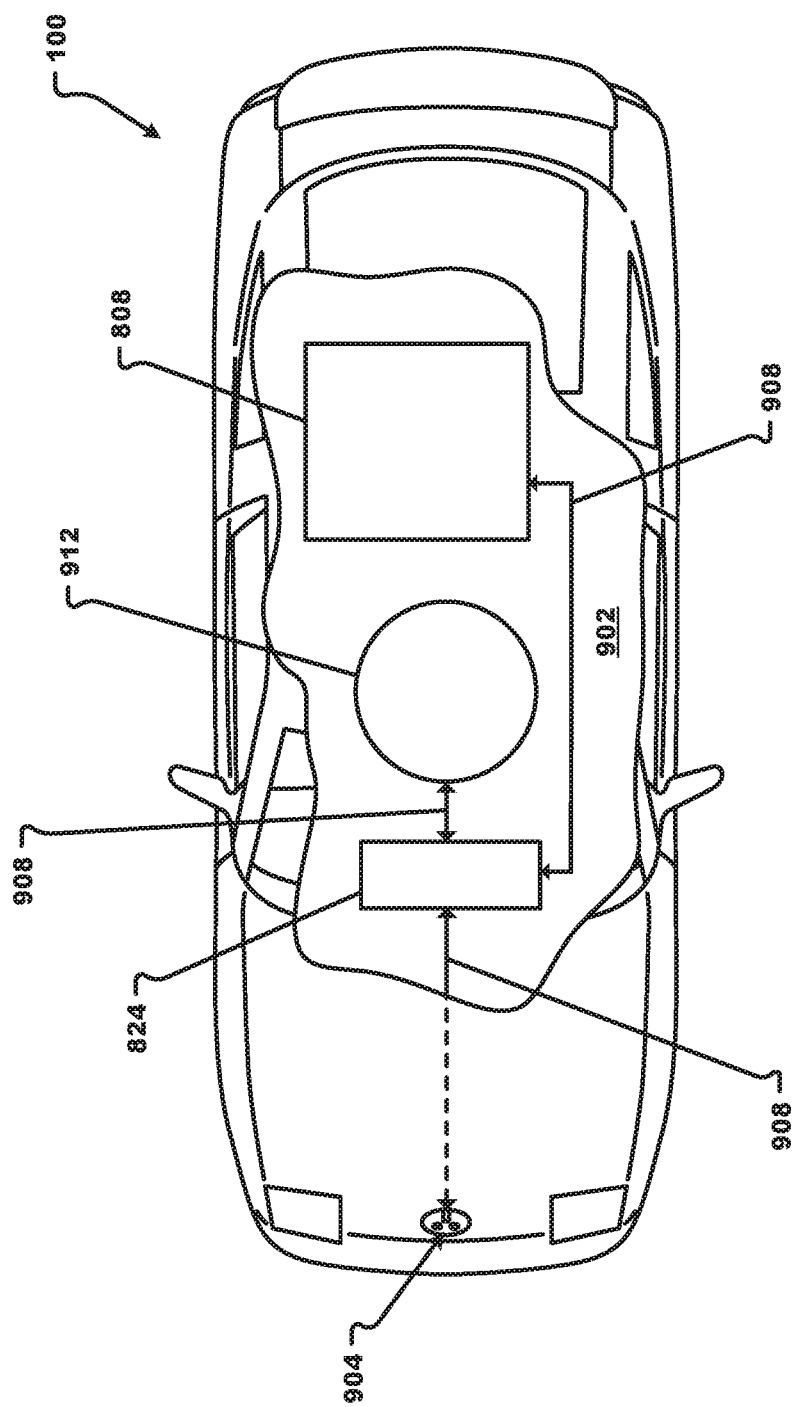
FIG. 9 is a plan view of a vehicle in accordance with at least some embodiments of the present disclosure.

FIG. 9 shows a plan view of the vehicle 100 in accordance with embodiments of the present disclosure. In particular, FIG. 9 shows a broken section 902 of a charging system for the vehicle 100. The charging system may include a plug or receptacle 904 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 904 may be transferred via at least one power transmission interconnection 908. Similar, if not identical, to the electrical interconnections 828 described above, the at least one power transmission interconnection 908 may be one or more cables, wires, traces, wireless power transmission systems, etc., and/or combinations thereof. Electrical energy in the form of charge can be transferred from the external power source to the charge controller 824. As provided above, the charge controller 824 may regulate the addition of charge to the power source 808 of the vehicle 100 (e.g., until the power source 808 is full or at a capacity, etc.).

In some embodiments, the vehicle 100 may include an inductive charging system and inductive charger 912. The inductive charger 912 may be configured to receive electrical energy from an inductive power source external to the vehicle 100. In one embodiment, when the vehicle 100 and/or the inductive charger 912 is positioned over an inductive power source external to the vehicle 100, electrical energy can be transferred from the inductive power source to the vehicle 100. For example, the inductive charger 912 may receive the charge and transfer the charge via at least one power transmission interconnection 908 to the charge controller 824 and/or the power source 808 of the vehicle 100. The inductive charger 912 may be concealed in a portion of the vehicle 100 (e.g., at least partially protected by the frame, one or more body panels, a shroud, a shield, a protective cover, etc., and/or combinations thereof) and/or may be deployed from the vehicle 100. In some embodiments, the inductive charger 912 may be configured to receive charge only when the inductive charger 912 is deployed from the vehicle 100. In other embodiments, the inductive charger 912 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 10:
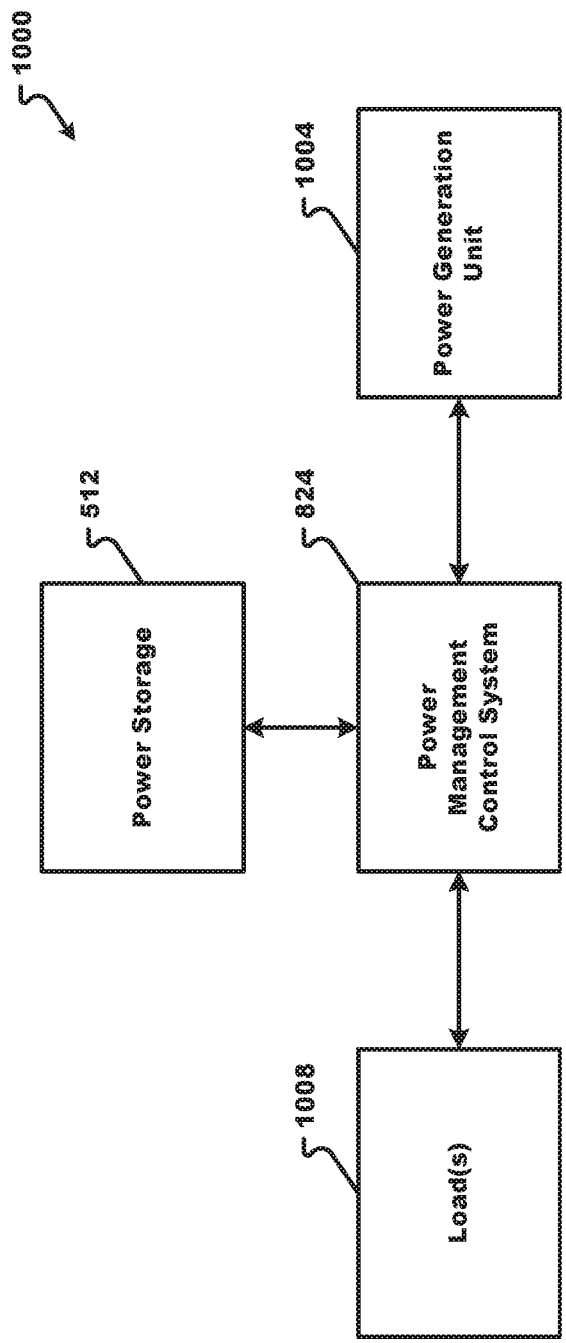
FIG. 10 is a block diagram of an embodiment of an electrical system of the vehicle.

An embodiment of the electrical system 1000 associated with the vehicle 100 may be as shown in FIG. 10. The electrical system 1000 can include power source(s) that generate power, power storage that stores power, and/or load(s) that consume power. Power sources may be associated with a power generation unit 1004. Power storage may be associated with a power storage system 512. Loads may be associated with loads 1008. The electrical system 1000 may be managed by a power management control system 824. Further, the electrical system 1000 can include one or more other interfaces or controllers.

Figure 11:
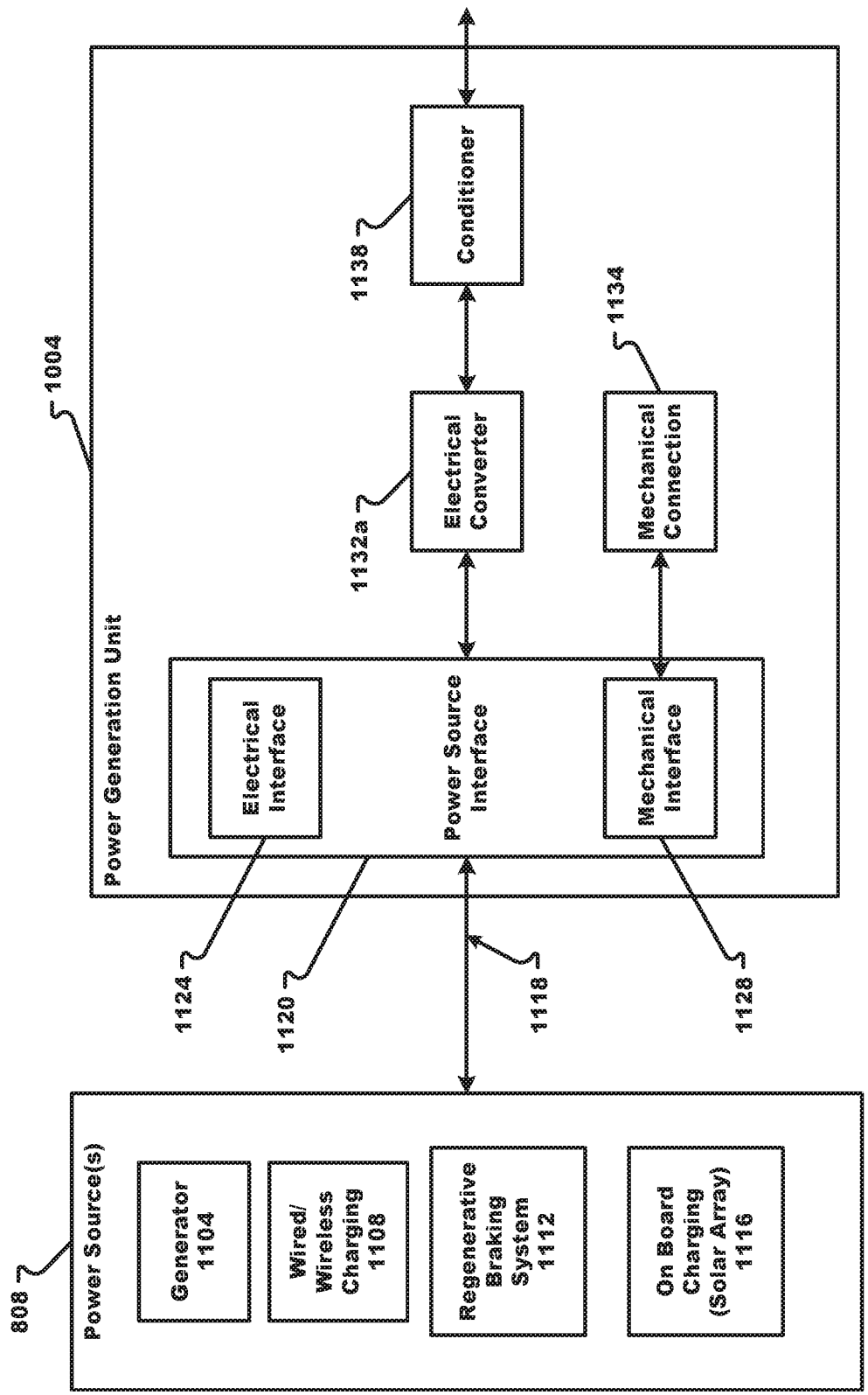
FIG. 11 is a block diagram of an embodiment of a power generation unit associated with the electrical system of the vehicle.

The power generation unit 1004 may be as described in conjunction with FIG. 11. The power storage component 512 may be as described in conjunction with FIG. 12. The loads 1008 can be any component of the vehicle that consumes power supplied by the power storage component 512.

The power management control system 824 can be a computer or computing system(s) and/or electrical system with associated components, as described herein, capable of managing the power generation unit 1004 to receive power, routing the power to the power storage 512, and then providing the power from either the power generation unit 1004 and/or the power storage 512 to the loads 1008. Thus, the power management control system 824 may execute programming that controls switches, devices, components, etc. involved in the reception, storage, and provision of the power in the electrical system 1000.

An embodiment of the power generation unit 1004 may be as shown in FIG. 11. Generally, the power generation unit 1004 may be electrically coupled to one or more power sources 808. The power sources 808 can include power sources internal and/or associated with the vehicle 100 and/or power sources external to the vehicle 100 to which the vehicle 100 electrically connects. One of the internal power sources can include an on board generator 1104. The generator 1104 may be an alternating current (AC) generator, a direct current (DC) generator or a self-excited generator. The AC generators can include induction generators, linear electric generators, and/or other types of generators. The DC generators can include homopolar generators and/or other types of generators. The generator 1104 can be brushless or include brush contacts and generate the electric field with permanent magnets or through induction. The generator 1104 may be mechanically coupled to a source of kinetic energy, such as an axle or some other power take-off. The generator 1104 may also have another mechanical coupling to an exterior source of kinetic energy, for example, a wind turbine.

Another power source 808 may include wired or wireless charging 1608. The wireless charging system 1108 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system can include connectors, wired interconnections, the controllers, etc. The wired and wireless charging systems 1108 can provide power to the power generation unit 1004 from external power sources 808.

Internal sources for power may include a regenerative braking system 1112. The regenerative braking system 1112 can convert the kinetic energy of the moving car into electrical energy through a generation system mounted within the wheels, axle, and/or braking system of the vehicle 100. The regenerative braking system 1112 can include any coils, magnets, electrical interconnections, converters, controllers, etc. required to convert the kinetic energy into electrical energy.

Another source of power 808, internal to or associated with the vehicle 100, may be a solar array 1116. The solar array 1116 may include any system or device of one or more solar cells mounted on the exterior of the vehicle 100 or integrated within the body panels of the vehicle 100 that provides or converts solar energy into electrical energy to provide to the power generation unit 1004.

The power sources 808 may be connected to the power generation unit 1004 through an electrical interconnection 1118. The electrical interconnection 1118 can include any wire, interface, bus, etc. between the one or more power sources 808 and the power generation unit 1004.

The power generation unit 1004 can also include a power source interface 1120. The power source interface 1120 can be any type of physical and/or electrical interface used to receive the electrical energy from the one or more power sources 808; thus, the power source interface 1120 can include an electrical interface 1124 that receives the electrical energy and a mechanical interface 1128 which may include wires, connectors, or other types of devices or physical connections. The mechanical interface 1108 can also include a physical/electrical connection 1134 to the power generation unit 1004.

The electrical energy from the power source 808 can be processed through the power source interface 1124 to an electric converter 1132. The electric converter 1132 may convert the characteristics of the power from one of the power sources into a useable form that may be used either by the power storage 512 or one or more loads 1008 within the vehicle 100. The electrical converter 1124 may include any electronics or electrical devices and/or component that can change electrical characteristics, e.g., AC frequency, amplitude, phase, etc. associated with the electrical energy provided by the power source 808. The converted electrical energy may then be provided to an optional conditioner 1138. The conditioner 1138 may include any electronics or electrical devices and/or component that may further condition the converted electrical energy by removing harmonics, noise, etc. from the electrical energy to provide a more stable and effective form of power to the vehicle 100.

An embodiment of the power storage 1112 may be as shown in FIG. 12. The power storage unit can include an electrical converter 1132*b*, one or more batteries, one or more rechargeable batteries, one or more capacitors, one or more accumulators, one or more supercapacitors, one or more ultrabatteries, and/or superconducting magnetics 1204, protection circuits 1212 to isolate a cell, battery, module, or battery pack to avoid the operating limits of the cell, battery, module or battery pack being exceeded, and/or a charge management unit 1208. The protection circuits 1212 typically include a thermal fuse (which will permanently shut down the battery pack if its temperature exceeds a predetermined limit), a thermistor (whose resistance varies with temperature as characterized by a Positive Temperature Coefficient ("PTC") or a Negative Temperature Coefficient ("NTC")), a resettable fuse (which has a similar function to a thermal fuse but after opening it will reset once the fault conditions have been removed and after it has cooled down again to its normal state), a conventional fuse, and/or over-current protection (which is a current sensing device that detects when the upper current limit of the cell, battery, module, or battery pack has been reached and interrupts the circuit).

The converter 1132*b* may be the same or similar to the electrical converter 1132*a* shown in FIG. 11. The converter 1132*b* may be a replacement for the electric converter 1132*a* shown in FIG. 11 and thus eliminate the need for the electrical converter 1132*a* as shown in FIG. 11. However, if the electrical converter 1132*a* is provided in the power generation unit 1004, the converter 1132*b*, as shown in the power storage unit 512, may be eliminated. The converter 1132*b* can also be redundant or different from the electrical converter 1132a shown in FIG. 11 and may provide a different form of energy to the battery pack and/or capacitors 1204. Thus, the converter 1132b can change the energy characteristics specifically for the battery pack/capacitor 1204.

The battery pack 1204 can be comprised of any type of battery for storing electrical energy, for example, a lithium ion battery, a lead acid battery, a nickel cadmium battery, etc. Further, the battery pack 1204 may include different types of power storage systems, such as, ionic fluids or other types of fuel cell systems. The energy storage 1204 may also include one or more high-capacity capacitors 1204. The capacitors 1204 may be used for long-term or short-term storage of electrical energy. The input into the battery pack or capacitors 1204 may be different from the output, and thus, the capacitors 1204 may be charged quickly but drain slowly. The functioning of the converter 1132 and battery pack or capacitor 1204 may be monitored or managed by a charge management unit 1208.

The charge management unit 1208 can include any hardware (e.g., any electronics or electrical devices and/or components), software, or firmware operable to adjust the operations of the converter 1132 or batteries/capacitors 1204. The charge management unit 1208 can receive inputs or periodically monitor the converter 1132 and/or battery pack/capacitor 1204 from this information; the charge management unit 1208 may then adjust settings or inputs into the converter 1132 or battery pack/capacitor 1204 to control the operation of the power storage system 512.

In one application, the charge controller 824 acts as a battery management system that monitors the key battery pack operating parameters of voltage, current, state of charge ("SOC"), and internal and ambient temperature and controls a charger to provide a selected charging rate that produces the required constant current/constant voltage (CC/CV) charging profile and triggers the protection circuits 1212 when the battery pack's operating limits of the battery pack 1204 are exceeded, isolating the battery pack 1204 if needed.

Figure 13:
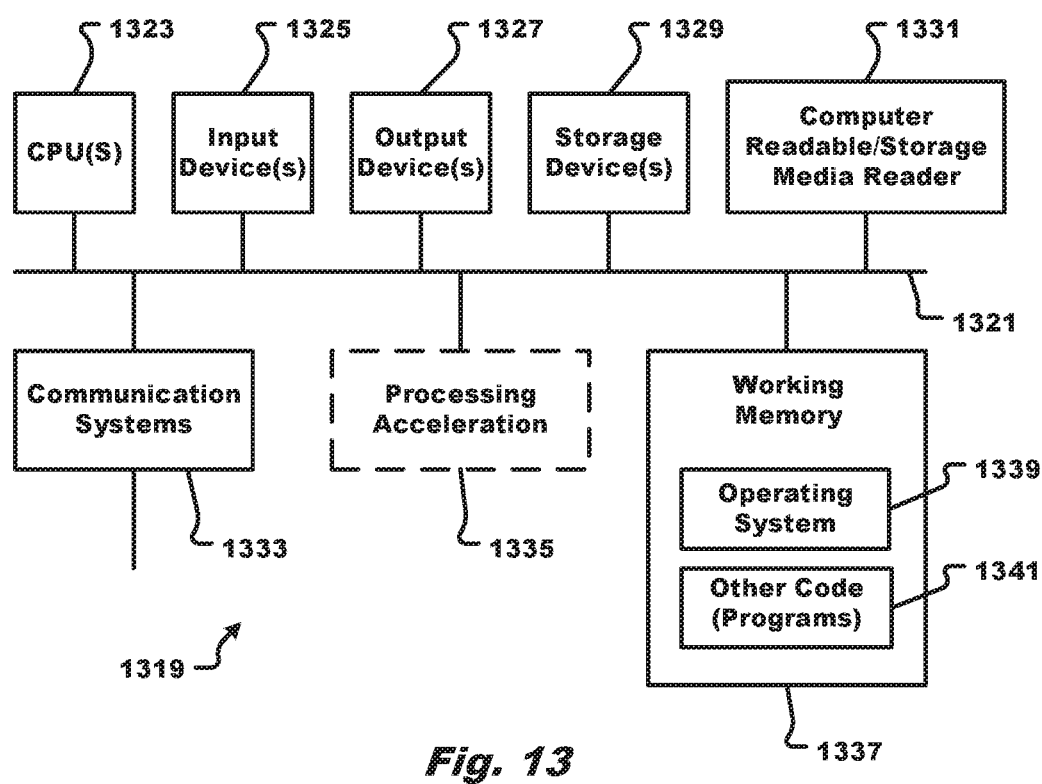
FIG. 13 is a block diagram of a computing environment associated with the embodiments presented herein.

FIG. 13 illustrates one embodiment of a computer system 1319 upon which the servers, user computers, computing devices, or other systems or components described above may be deployed or executed. The computer system 1319 is shown comprising hardware elements that may be electrically coupled via a bus 1321. The hardware elements may include one or more central processing units (CPUs) 1323; one or more input devices 1325 (e.g., a mouse, a keyboard, etc.); and one or more output devices 1327 (e.g., a display device, a printer, etc.). The computer system 1319 may also include one or more storage devices 1329. By way of example, storage device(s) 1329 may be disk drives, optical storage devices, solid-state storage devices such as a random access memory ("RAM") and/or a read-only memory ("ROM"), which can be programmable, flash-updateable and/or the like.

The computer system 1319 may additionally include a computer-readable storage media reader 1331; a communications system 1333 (e.g., a modem, a network card (wireless or wired), an infra-red communication device, etc.); and working memory 1337, which may include RAM and ROM devices as described above. The computer system 1319 may also include a processing acceleration unit 1335, which can include a DSP, a special-purpose processor, and/or the like.

The computer-readable storage media reader 1331 can further be connected to a computer-readable storage medium, together (and, optionally, in combination with storage device(s) 1329) comprehensively representing remote, local, fixed, and/or removable storage devices plus storage media for temporarily and/or more permanently containing computer-readable information. The communications system 1333 may permit data to be exchanged with a network and/or any other computer. Moreover, as disclosed herein, the term "storage medium" may represent one or more devices for storing data, including read only memory (ROM), random access memory (RAM), magnetic RAM, DRAM, SDRAM, core memory, magnetic disk storage mediums, optical storage mediums, flash memory devices and/or other machine readable mediums for storing information.

The computer system 1319 may also comprise software elements, shown as being currently located within a working memory 1337, including an operating system 1339 and/or other code 1341. It should be appreciated that alternate embodiments of a computer system 1319 may have numerous variations from that described above. For example, customized hardware might also be used and/or particular elements might be implemented in hardware, software (including portable software, such as applets), or both. Further, connection to other computing devices such as network input/output devices may be employed.

The CPU(s) 1323 can interact with the working memory 1337 to store information and operations necessary for configuring and transmitting or receiving the information described herein. The working memory 1337 may also be used in connection with the execution of application programming or instructions by the CPU(s) 1323, and for temporary or long term storage of program instructions and/or data.

The CPU(s) 1323 may include multiple processor cores, and/or implement multiple virtual processors. Optionally, the CPU(s) 1323 may include multiple physical processors. By way of example, the CPU(s) 1323 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like. Examples of the CPU(s) or processors 1323 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 14:
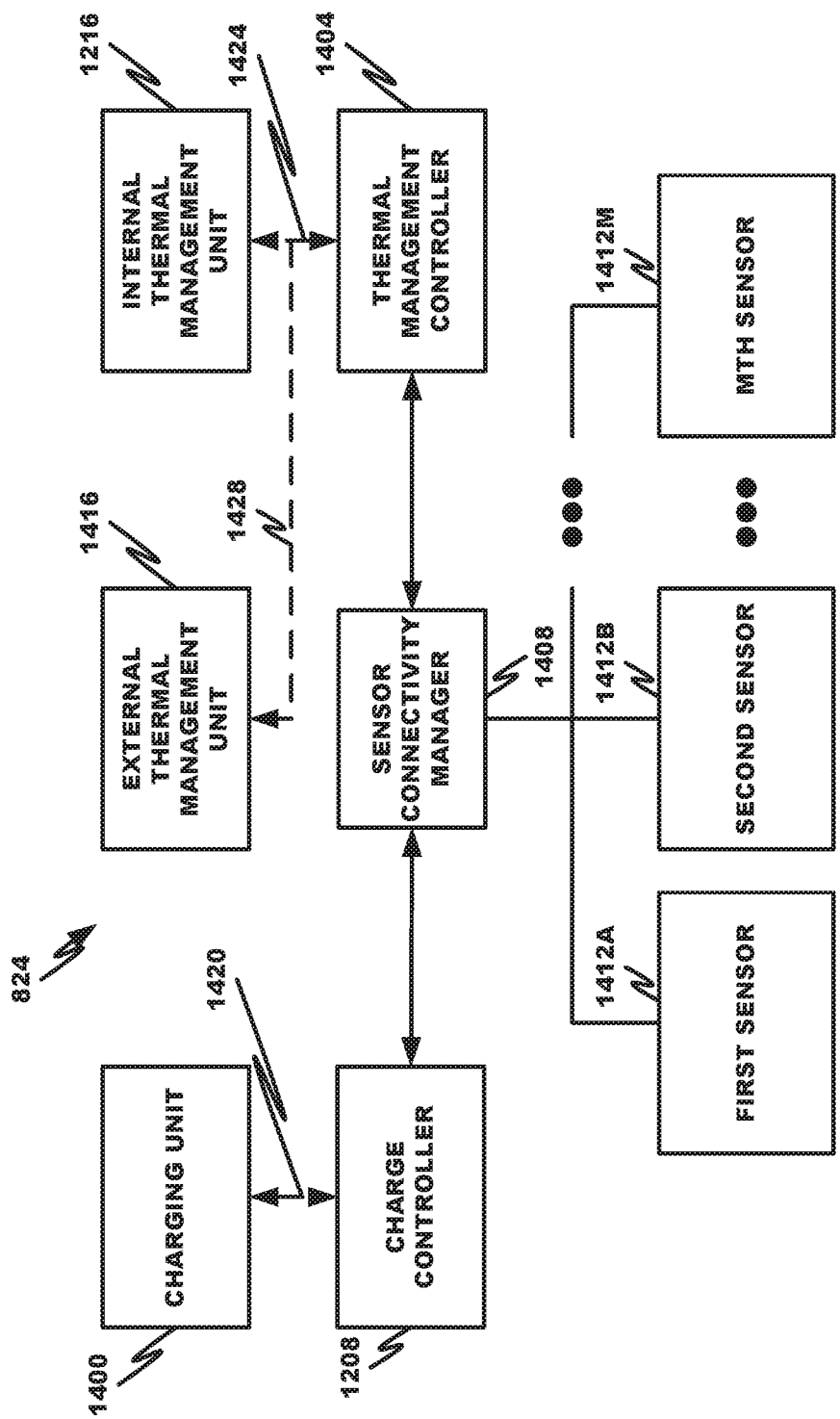
FIG. 14 is a block diagram of a power management system according to an embodiment.

With reference to FIG. 14, the power management control system 824 is depicted. The power management control system 824 includes a charging unit 1400, charge controller 1208, internal thermal management unit 1216, thermal management controller 1404, sensor connectivity manager 1408, and associated first, second, . . . mth sensors 1412A-M in communication with an external thermal management unit 1416.

The charging unit 1400 can be on board the vehicle or external to the vehicle and can be any suitable charging unit compatible with the energy storage unit, including without limitation any of emergency charging vehicle system 270, aerial vehicle charging system 280, roadway system 250, robotic charging system 254, overhead charging system 258, and operator-based charging system 294 (such as a home- or garage-based charging unit (not shown)). The charge controller 1208 controls the operation, settings, and configuration of the charging unit by means of wired or wireless link 1420.

The sensor connectivity manager 1408 interfaces or interacts with the first, second, . . . Mth sensor 1412A-M to provide battery pack state information. This information can include one or more of AC or DC current sensor, battery classification for the battery pack, C- and E-rates for the battery pack, stored energy capacity or nominal capacity, energy or nominal energy (Wh for a specific C-rate), cycle life (number for a specific DOD), specific energy, specific power, energy density, power density, maximum continuous discharge current, maximum 30-second discharge pulse current, charge voltage, float voltage, (recommended) charge current, (maximum) internal resistance, terminal voltage, open-circuit voltage, internal resistance, nominal voltage, cut-off voltage, winding temperature, rotor speed, battery pack voltage level, output electrical current, electrical current direction of flow, leakage current, internal battery pack temperature, ambient temperature, depth-of-charge, state-of-charge, or state-of-health, and state-of-function.

The external thermal management unit 1416 can be any device capable of heating and/or cooling a thermal management fluid that is passed through all or part of the battery pack. Exemplary heating devices include electric heating devices (e.g., radiant heaters, convection heaters, fan heaters, heat pumps, immersion heaters, direct electric heat exchangers, and electrode heaters), infrared heaters, microwave heaters, electromagnetic heaters, and other conduction, convection, and/or radiant heating devices. Exemplary cooling devices include direct, indirect, or multi-stage evaporative cooler (which cools the thermal management fluid through water evaporation), vapor-compression cycle refrigeration cycle devices (which typically comprise a fluid refrigerant, a compressor that controls the flow of the refrigerant, a condenser coil located outside the device, an evaporator coil located inside the device, and an expansion device), acoustic cooling devices, magnetic cooling devices, pulse type cooling devices, Sterling cycle cooling devices, other cryocooling devices, thermoelectric cooling and thermionic cooling devices, vortex tube cooling devices, water cycle cooling devices, and other cooling devices. When used for cooling, the thermal management unit can include ethylene glycol or a derivative thereof to raise the boiling point of the fluid and/or lower the freezing point of the fluid. A heat exchanger can be used to transfer thermal energy from a heat exchange medium to or from the thermal management fluid.

Figure 16:
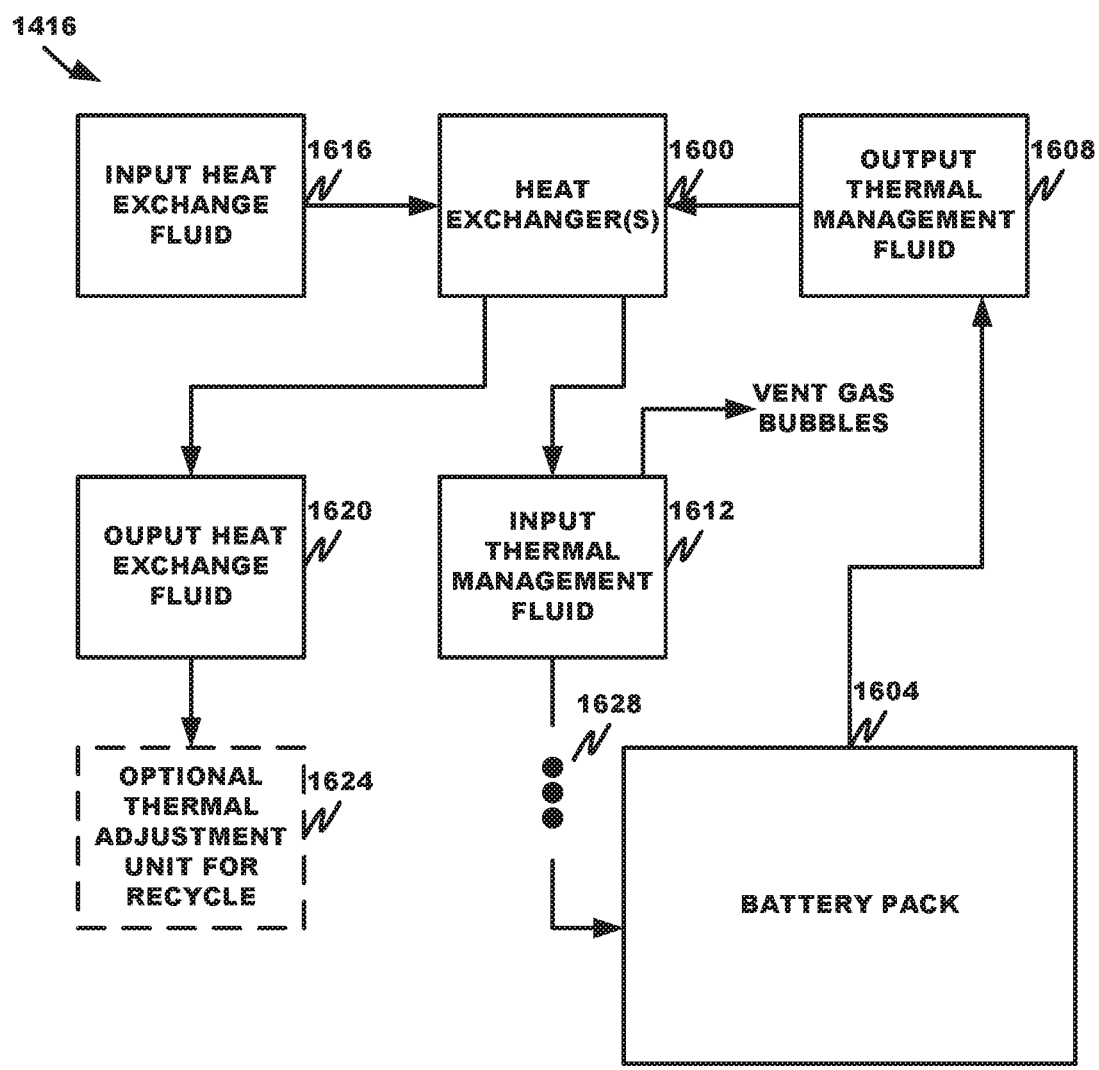
FIG. 16 is a block diagram of an external thermal management unit according to an embodiment.

An exemplary external thermal management unit 1416 is depicted in FIG. 16. The external thermal management unit 1416 comprises a heat exchanger 1600 in fluid communication with the battery pack 1604. An output thermal management fluid 1608, which can be a liquid or gas, flows out of the battery pack 1604 and is passed through the heat exchanger 1600 to produce an input thermal management fluid 1612 for return to the fluid pathways in the battery pack 1604 (which fluid pathways may be outside or inside the cell, battery, module or battery pack enclosure). Typically, the pathways pass through cooling plates supporting the cells, batteries, and/or modules in the battery pack. Depending on whether the internal battery pack temperature is being increased or decreased, the heat exchanger 1600 adds thermal energy to or removes thermal energy from the output thermal management fluid 1608 to produce a hotter or cooler input thermal management fluid 1612. Heat is added or removed by the heat exchanger 1600 by indirectly contacting a hotter or cooler (respectively) input heat exchange fluid 1616 (which may a liquid or gas) with the output thermal management fluid by means of a coil or other conduit. The output heat exchange fluid 1620 is cooler or hotter than the input heat exchange fluid 1616 depending on whether heat is added to or removed from the output thermal management fluid 1608 (respectively). The cooled or heated output heat exchange fluid 1620 may optionally be heated or cooled (respectively) by an optional thermal adjustment unit 1624 for recycle as the input heat exchange fluid 1616 to the heat exchanger 1600. The ellipses 1628 refer to the optional passing of the input thermal management fluid 1612 through all or part of the internal thermal management unit 1216 as discussed below.

Because the external thermal management is connected to and disconnected from the battery pack 1604, gas, such as air, can be introduced into the thermal management fluid, thereby impairing thermal performance of the thermal management fluid. The gas bubbles, in the case of a liquid thermal management fluid, can be vented by known techniques into the atmosphere and thereby removed from the thermal management fluid.

In some applications, the external thermal management unit 1416 can include alternative first and second heat exchangers and conduits and valves to selectively pass the output thermal management fluid 1608 through a selected one of the heat exchangers depending on whether the temperature of the output thermal management fluid is to be increased or decreased. The first heat exchanger adds thermal energy to and the second heat exchanger removes thermal energy from the thermal management fluid. In some configurations, a first portion of the output thermal management fluid can be directed to the first heat exchanger and a second portion simultaneously directed to the second heat exchanger and thereafter recombined to produce a combined input thermal management fluid having a selected temperature for introduction into the battery pack 1604.

The external thermal management unit 1416 can be located at a charging station, at an emergency charging vehicle system 270, on an aerial vehicle charging system 280, at a roadway system 250, at a robotic charging system 254, at an overhead charging system 258, or at an operator-based charging system 294 (such as a home- or garage-based charging unit).

Thermal management fluid input and output conduits to and from the external thermal management unit 1416 can be fluidly engaged simultaneously with electrical engagement of an external power source with the plug or receptacle 904 on the vehicle 100.

As discussed in more detail below, the thermal management controller 1404 controls, via wired or wireless links 1424 and 1428, the operations, settings, and configurations of both the internal and external thermal management units 1216 and 1416.

Figure 15A:
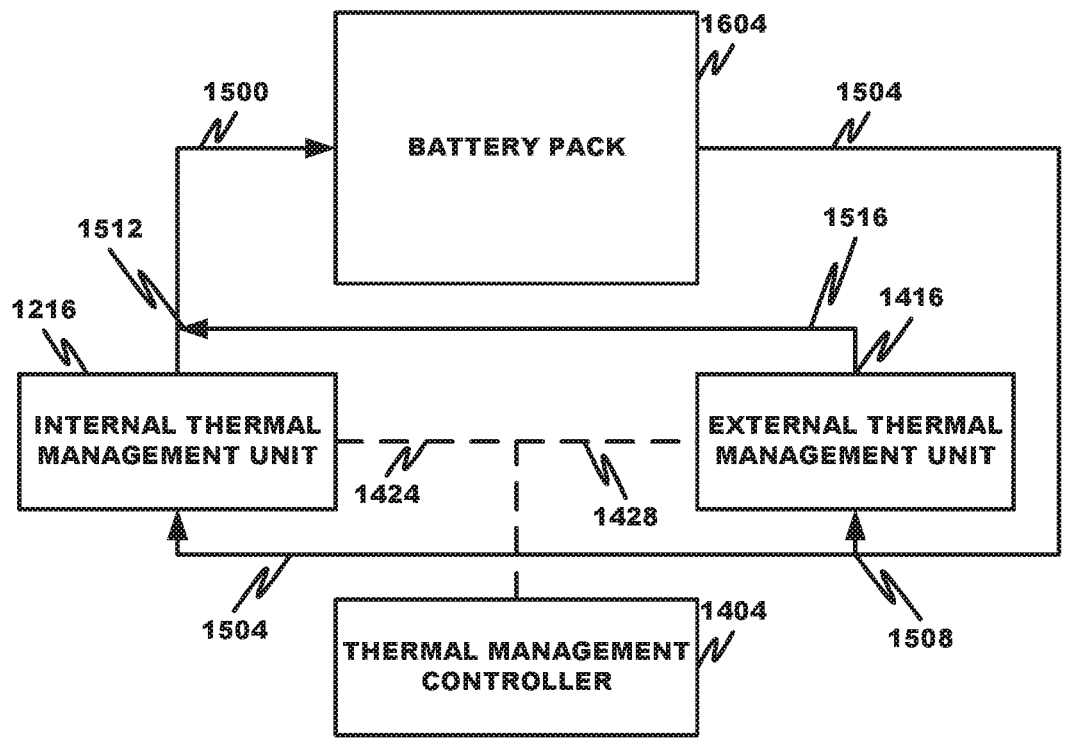
FIG. 15A is a block diagram of a thermal management system according to an embodiment.

With reference to FIG. 15A, a first configuration of the internal and external thermal management units is depicted. The internal thermal management unit 1216 is connected to the battery pack 1604 via first and second conduits 1500 and 1504. As discussed, the internal thermal management unit 1216, first and second conduits 1500 and 1504, and thermal management controller 1404 are on board the vehicle 100. The external thermal management unit 1416 is connected to the first and second conduits 1500 and 1504 as shown. First and second valves 1508 and 1512 are closed or opened (depending on the implementation) by the thermal management controller 1404 to fluidly isolate the internal thermal management 1216 from the thermal management fluid heated or cooled by the external thermal management unit 1416. This thermal management fluid is circulated via a third conduit 1516, the upper left part of the first conduit 1500, and upper right part of the second conduit 1504 and the fluid pathways through the battery pack 1604.

When the external thermal management unit 1416 is disconnected, the internal thermal management unit 1216 circulates its thermal management fluid via the loop defined by the entire lengths of the first and second conduits 1500 and 1504 and the fluid pathways through the battery pack 1604. In this configuration, the thermal management fluid heated or cooled by the external thermal management unit 1416 bypasses the heating or cooling components (e.g., heat exchanger(s)) of the internal thermal management unit 1216.

Figure 15B:
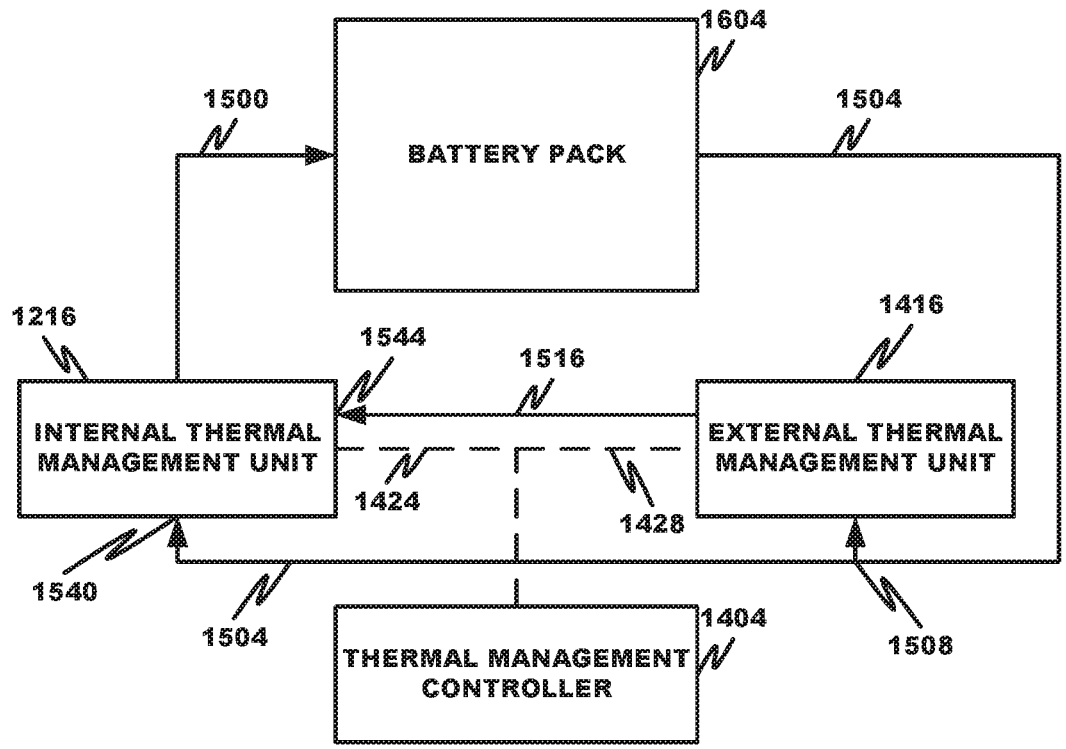
FIG. 15B is a block diagram of a thermal management system according to an embodiment.

With reference to FIG. 15B, a second configuration of the internal and external thermal management units is depicted. The internal thermal management unit 1216 is connected to the battery pack 1604 via the first and second conduits 1500 and 1504. As discussed, the internal thermal management unit 1216, first and second conduits 1500 and 1504, and thermal management controller 1404 are on board the vehicle 100. The external thermal management unit 1416 is connected to the second conduit 1504 and internal thermal management unit 1216 as shown. First and second valves 1508 and 1540 are closed or opened (depending on the implementation) by the thermal management controller 1404 to fluidly isolate the intervening potion of the second conduit 1504. Unlike the first configuration, the internal thermal management unit 1216 is not fluidly isolated from the thermal management fluid heated or cooled by the external thermal management unit 1416 but the thermal management fluid can be further heated or cooled (respectively) by the thermal management fluid; that is, the thermal management fluid heated or cooled by the external thermal management unit 1416 is passed through the internal thermal management unit 1216 and its components (e.g., heat exchanger(s)) and is further heated or cooled (respectively). A third valve 1544 is opened or closed (depending on the configuration) by the thermal management controller 1404 to enable the thermal management fluid to pass from the external thermal management unit 1416 to the internal thermal management unit 1216 or vice versa. This thermal management fluid is circulated via the third conduit 1516, the upper left part of the first conduit 1500, and upper right part of the second conduit 1504 and the fluid pathways through the battery pack 1604.

When the external thermal management unit 1416 is disconnected, the internal thermal management unit 1216 circulates its thermal management fluid via the loop defined by the entire lengths of the first and second conduits 1500 and 1504 and the fluid pathways through the battery pack 1604. In this configuration, the thermal management fluid heated or cooled by the external thermal management unit 1416 can optionally be further heated or cooled (as appropriate) by the heating or cooling components (e.g., heat exchanger) of the internal thermal management unit 1216.

In either of the first and second configurations, a common thermal management fluid is normally used (or circulated) at the same or different times by the internal and external thermal management units 1216 and 1416.

Figure 17A:
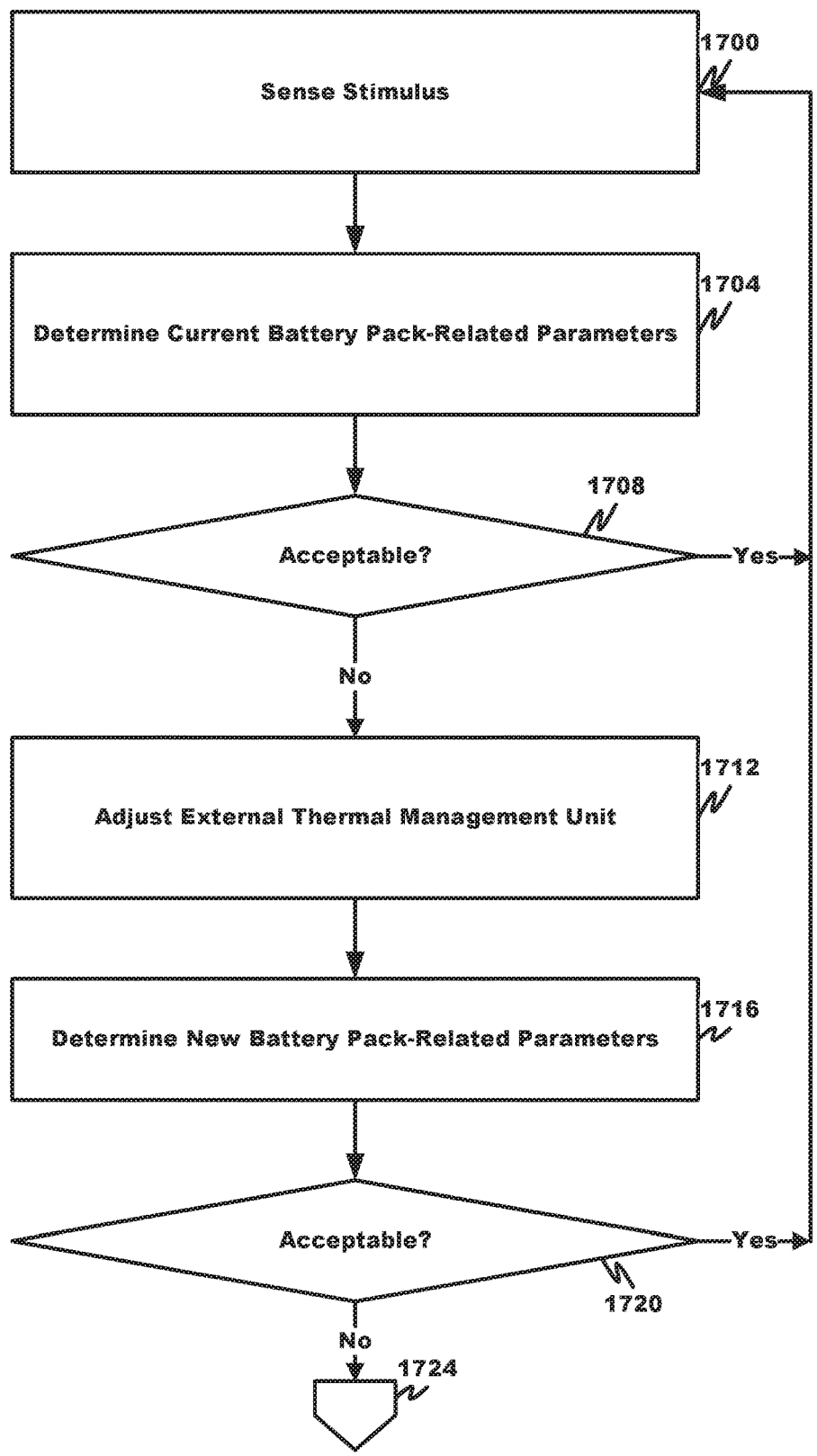
FIG. 17A is a flow chart of processor executable instructions according to an embodiment.
Figure 17B:
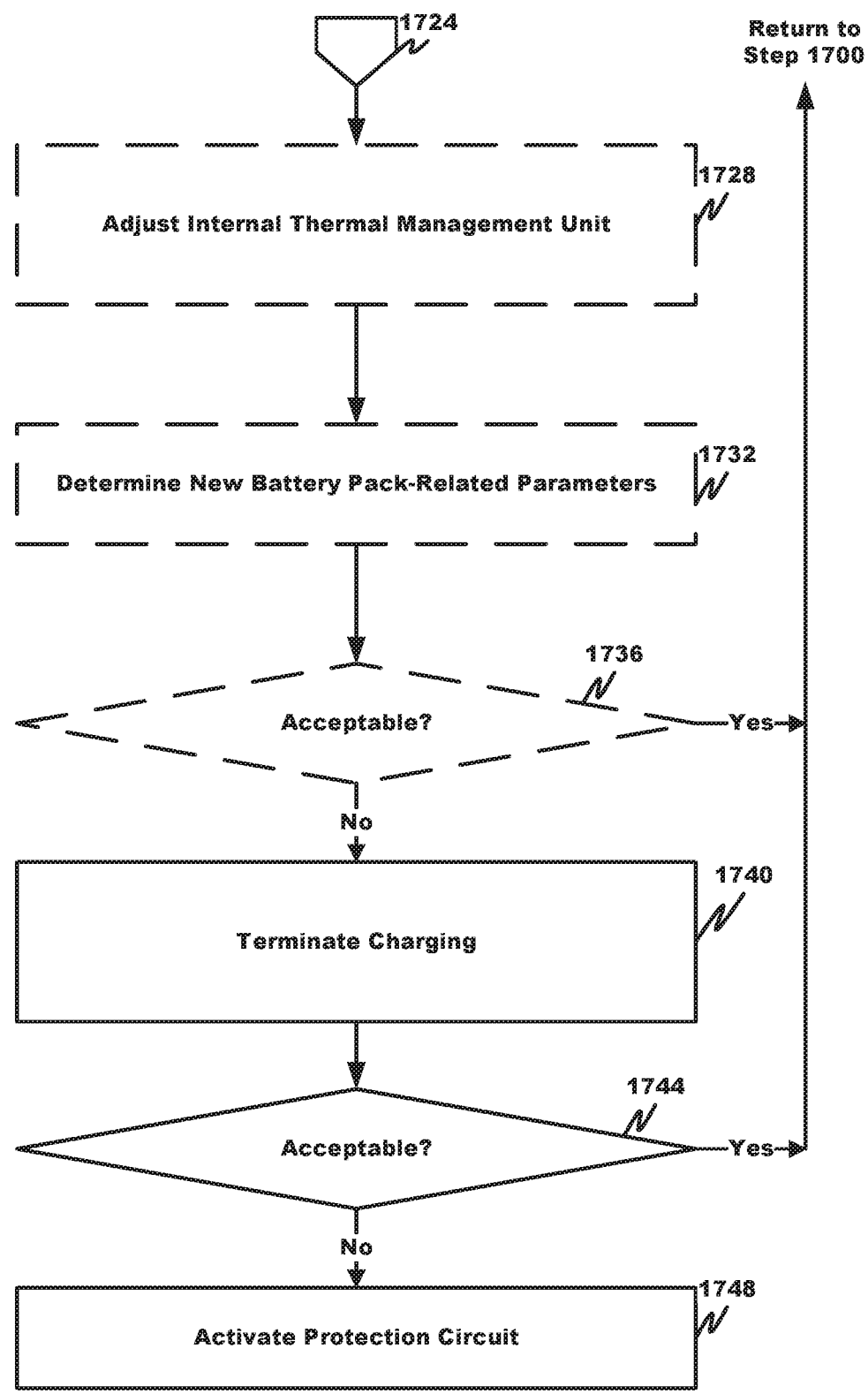
FIG. 17B is a flow chart of processor executable instructions according to an embodiment.

With reference to FIGS. 17A and 17B, a flow chart according to an embodiment will be discussed.

In step 1700, the power management control system 824 senses a stimulus, such as an external power source being connected to the plug or receptacle 904 on the vehicle 100, an ambient temperature exceeding or dropping below a selected threshold, an alarm or interrupt that a battery pack parameter is outside of a selected or predetermined operating range, and the like.

In step 1704, the power management control system 824 determines current battery pack-related parameters from the sensor connectivity manager 1408.

In step 1708, the power management control system 824 determines whether or not all or selected ones of the battery pack-related parameters are acceptable. This can be done by any suitable technique.

In one application, the power management control system 824 executes plural sub-modules sequentially or in parallel to assess battery pack health or state.

A battery model sub-module characterizes in a software algorithm, the behavior of the battery in response to various external and internal conditions. The model can then use these inputs to estimate the status of the battery at any instant in time. The SOC indication can be used by the model to determine the end of the charging and discharging cycles. Over-charging and over-discharging are two of the prime causes of battery pack failure and the power management control system must maintain the cells within the desired DOD operating limits. The SOC can be determined by integrating the current flow over time, modified to account for the many factors which affect the performance of the cells, then subtracting the result from the known capacity of the fully charged battery.

A multiplexing sub-module operates a multiplexing architecture which switches the voltage from each cell (input pairs) in turn to a single analog or digital output line. The multiplexing sub-module executes a high speed switching mechanism to switch the output line to each cell so that all cells can be monitored sequentially.

A demand or personality sub-module resembles the battery model sub-module in that it contains a reference model with all the tolerances and limits relevant to the various parameters monitored by the battery model. The demand sub-module receives instructions from a communications bus such as commands to accept a regenerative braking charge or from other vehicle sensors or directly from the vehicle operator. This demand sub-module is also used to set and to monitor the vehicle operating mode parameters particularly with reference to the battery pack. The demand sub-module also contains a memory block for holding all the reference data and for accumulating the historical data used for monitoring the battery state of health ("SOH"). The outputs from the demand sub-module can provide the reference points for setting the operating conditions of the battery pack or triggering the action of the protection circuits.

A decision logic sub-module compares the status of the measured or calculated battery pack-related parameters from the battery model sub-module with the desired or reference result from the demand sub-module. Logic circuits, such as those in FIG. 18, then provide error messages to initiate cell protection actions or to be used in the various power management control system feedback loops which drive the power management control system to its desired operating point or isolate the battery in the case of unsafe conditions.

These error messages provide the input signals for the charge controller 1208 or thermal management controller 1404.

When one or more of the battery pack-related parameters is not acceptable, the thermal management controller 1404, in step 1712 and based on commands of the power management control system, adjusts the external thermal management unit to provide the desired heating or cooling of the battery pack to bring the one or more of the battery pack-related parameters back within the selected or predetermined operating range(s). The adjustment can include adding or removing more or less heat to the thermal management fluid and/or increasing or decreasing a flow rate of the thermal management fluid through the battery pack or the heat exchange medium through the heat exchanger.

In step 1716, the power management control system determines new battery pack-related parameters via one or more control feedback loops.

In step 1720, the power management control system 824 determines whether or not all or selected ones of the battery pack-related parameters are acceptable. This can be done by any suitable technique, including those set forth above.

Referring to FIG. 17B, when one or more of the battery pack-related parameters is not acceptable, the thermal management controller 1404, in optional step 1728 and based on commands of the power management control system, adjusts the internal thermal management unit to further assist the external thermal management unit in providing the desired heating or cooling of the battery pack to bring the one or more of the battery pack-related parameters back within the selected or predetermined operating range(s). While the example is discussed with reference to the on board thermal management controller controlling the external thermal management unit, it is to be understood that an external thermal management controller, receiving commands from the power management control system can control the external thermal management unit.

In optional step 1732, the power management control system determines new battery pack-related parameters via one or more control feedback loops.

In optional step 1736, the power management control system 824 determines whether or not all or selected ones of the battery pack-related parameters are acceptable. This can be done by any suitable technique, including those set forth above.

When one or more of the battery pack-related parameters is not acceptable, the charge controller 1208, in step 1740 and based on commands of the power management control system, terminates charging of the battery pack. In some implementations, the charging of the battery pack is decreased in a step-wise fashion to control battery pack internal temperature, typically based on the SOC of the battery pack. As the SOC increases, the degree of charging (or magnitude of the charging current) is decreased, thereby requiring a longer period of time to attain a predetermined higher level of SOC of the battery pack.

In step 1744, the power management control system determines new battery pack-related parameters via one or more control feedback loops and, when one or more of the battery pack-related parameters is still not acceptable, the charge controller 1208, in step 1748 and based on commands of the power management control system, activates one or more protection circuits depending on the severity of the battery pack system deviation from the selected battery pack-related parameters.

Figure 18:
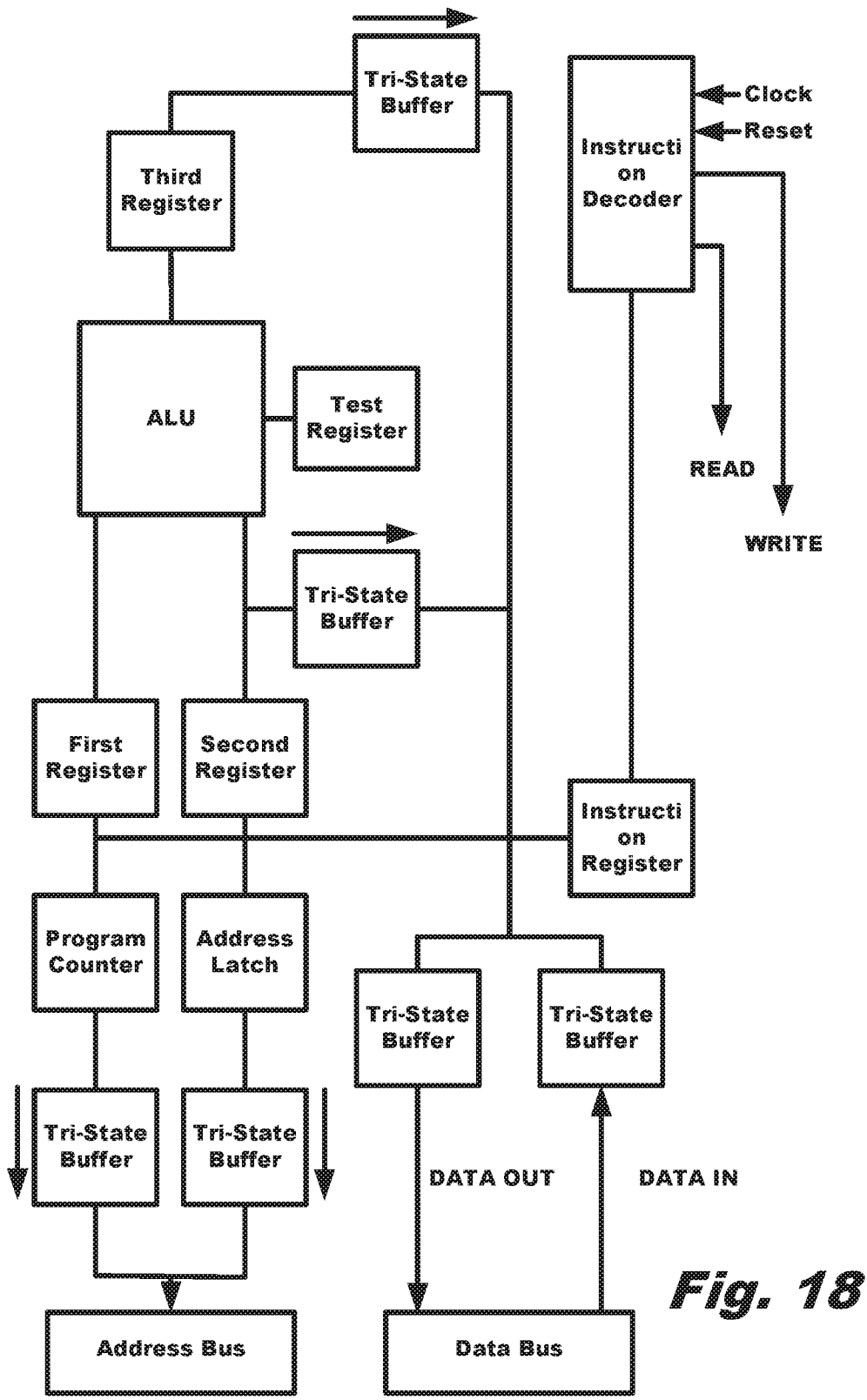
FIG. 18 is a block diagram of a computational system according to an embodiment.

With reference to FIG. 18, the logical instructions are executed by an arithmetic/logic unit ("ALU"), which performs mathematical operations, such as addition, subtraction, multiplication, and division, machine instructions, an address bus (that sends an address to memory), a data bus (that can send data to memory or receive data from memory), a read and write line to tell the memory whether to set or get the addressed location, a clock line that enables a clock pulse to sequence the processor, and a reset line that resets the program counter to zero or another value and restarts execution. The arithmetic/logic unit can be a floating point processor that performs operations on floating point numbers. The power management control system (and the component thermal management and charge controllers) further includes first, second, and third registers that are typically configured from flip-flops, an address latch, a program counter (which can increment by "1" and reset to "0"), a test register to hold values from comparisons performed in the arithmetic/logic unit (such as comparisons in any of the steps of FIGS. 17A-B), plural tri-state buffers to pass a "1" or "0" or disconnect its output (thereby allowing multiple outputs to connect to a wire but only one of them to actually drive a "1" or "0" into the line), and an instruction register and decoder to control other components. Control lines, in the power management control system, from the instruction decoder can: command the first register to latch the value currently on the data bus, command the second register to latch the value currently on the data bus, command the third register to latch the value currently output by the ALU, command the program counter register to latch the value currently on the data bus, command the address register to latch the value currently on the data bus, command the instruction register to latch the value currently on the data bus, command the program counter to increment, command the program counter to reset to zero, activate any of the plural tri-state buffers (plural separate lines), command the ALU what operation to perform, command the test register to latch the ALU's test bits, activate the read line, and activate the write line. Bits from the test register and clock line as well as the bits from the instruction register come into the instruction decoder. Hardware similar or identical to that of FIG. 18 is in the power management control system (and the component thermal management and charge controllers) for executing the instructions of FIGS. 17A-B. The ALU executes instructions for a random or pseudo-random number generation algorithm and generates the recipient identifier using the appropriate seed values.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a charging system for a rechargeable electric vehicle that can comprise:

a rechargeable electric vehicle comprising an interior and exterior, the interior comprising a rechargeable energy storage unit in electrical communication with one or more electric motors to propel the vehicle and a receptacle to receive electrical energy to recharge the energy storage unit, and a first thermal management unit to control an operating temperature of the energy storage unit;

an external power source in electrical communication, by the receptacle, with the energy storage unit; and a second thermal management unit located outside the rechargeable electric vehicle exterior and in fluid communication with the energy storage; and a microprocessor programmed, based on an energy storage unit-related parameter, to control an operating temperature of the energy storage unit by passing a thermal management fluid through at least part of the first thermal management unit or a thermal management fluid recycle loop in fluid communication with the first thermal management unit.

Embodiments include a method that can comprise the steps:

electrically connecting an external power source to a rechargeable electric vehicle comprising an interior and exterior, the interior comprising a rechargeable energy storage unit in electrical communication with one or more electric motors to propel the vehicle and a receptacle to receive electrical energy to recharge the energy storage unit, and a first thermal management unit to control an operating temperature of the energy storage unit, wherein the external power source, after electrical connection, is in electrical communication, by the receptacle, with the energy storage unit; and during charging of the energy storage unit by the external power source, passing, by a second thermal management unit located outside the rechargeable electric vehicle exterior and in fluid communication with the energy storage unit, a thermal management fluid through at least part of the energy storage unit to control the energy storage unit temperature, wherein the thermal management fluid passes through at least part of the first thermal management unit or a thermal management fluid recycle loop in fluid communication with the first thermal management unit.

Embodiments include a thermal management system that can comprise:

a heat exchanger to transfer thermal energy to or from a thermal management fluid;

a pressure source to pressurize the thermal management fluid;

an input and output to the heat exchanger for the thermal management fluid; and a connector on each of the input and output to connect to an on board thermal management unit of a rechargeable electric vehicle, wherein the thermal management fluid passes, under pressure, through an on board energy storage unit of the vehicle, via at least part of the on board thermal management unit, to control an operating temperature of the energy storage unit while the energy storage unit is being charged by an external power source.

Aspects of the above can include one or more of the thermal management fluid being a gas or liquid, the second thermal management unit decreasing the operating temperature of the energy storage unit during charging by the external power source, the energy storage unit being a battery pack, the energy storage unit-related parameter being one or more of C- and E-rates for the battery pack, stored energy capacity or nominal capacity, energy or nominal energy (Wh for a specific C-rate), cycle life (number for a specific DOD), specific energy, specific power, energy density, power density, maximum continuous discharge current, maximum 30-second discharge pulse current, charge voltage, float voltage, (recommended) charge current, internal resistance, terminal voltage, winding temperature, battery pack voltage level, output electrical current, leakage current, internal battery pack temperature, depth-of-charge, state-of-charge, or state-of-health, and state-of-function, and the thermal management fluid passing through a heat exchanger of the first thermal management unit.

Aspects of the above can include one or more of the second thermal management unit lowering, by heat transfer to the thermal management fluid, the operating temperature of the energy storage unit during charging, the second thermal management unit comprising one or more of a direct, indirect, or multi-stage evaporative cooler, vapor-compression cycle refrigeration cycle device acoustic cooling device, magnetic cooling device, pulse type cooling device, Sterling cycle cooling device, thermoelectric cooling or thermionic cooling device, vortex tube cooling device, and water cycle cooling device, and a heat exchange medium removing heat from the thermal management fluid via a heat exchanger.

Aspects of the above can include one or more of the thermal management fluid being a gas or liquid, the second thermal management unit decreasing the operating temperature of the energy storage unit during charging by the external power source, the energy storage unit being a battery pack, the energy storage unit-related parameter being one or more of C- and E-rates for the battery pack, stored energy capacity or nominal capacity, energy or nominal energy (Wh for a specific C-rate), cycle life (number for a specific DOD), specific energy, specific power, energy density, power density, maximum continuous discharge current, maximum 30-second discharge pulse current, charge voltage, float voltage, (recommended) charge current, internal resistance, terminal voltage, winding temperature, battery pack voltage level, output electrical current, leakage current, internal battery pack temperature, depth-of-charge, state-of-charge, or state-of-health, and state-of-function, and the thermal management fluid passing through the recycle loop.

Aspects of the above can include one or more of the microprocessor isolating the first thermal management unit from flow of the thermal management fluid by closing one or more valves in fluid communication with the recycle loop, the thermal management fluid being a liquid, the liquid comprising ethylene glycol, and, in a first operating mode, the thermal management fluid being cooled by the first but not the second thermal management unit and, in a different second operating mode, the thermal management fluid being cooled by the second but not the first thermal management unit.

Aspects of the above can include one or more of the thermal management fluid removing thermal energy from the energy storage unit and the heated thermal management fluid having a first portion of the removed thermal energy removed by the second thermal management unit, and a second portion of the removed thermal energy removed by the first thermal management unit followed by recycle of the cooled thermal management fluid to the energy storage unit.

Aspects of the above can include one or more of the second thermal management unit removably attaching to and detaching from the at least part of the first thermal management unit or a thermal management fluid recycle loop and the first or second thermal management unit comprising a mechanism to remove gas bubbles from the thermal management fluid introduced by attachment of the second thermal energy unit.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A charging system, comprising:
a rechargeable electric vehicle comprising an interior and exterior, the interior comprising a rechargeable energy storage unit in electrical communication with one or more electric motors to propel the electric vehicle and a receptacle to receive electrical energy to recharge the energy storage unit, and a first thermal management unit to control an operating temperature of the energy storage unit;
an external power source in electrical communication, by the receptacle, with the energy storage unit;
a second thermal management unit located outside the rechargeable electric vehicle exterior and in fluid communication with the energy storage unit; and
a microprocessor programmed, based on an energy storage unit-related parameter, to control an operating temperature of the energy storage unit by passing, via the second thermal management unit, a thermal management fluid through at least part of the first thermal management unit or a thermal management fluid recycle loop in fluid communication with the first thermal management unit, wherein the microprocessor is programmed to isolate the first thermal management unit from flow of the thermal management fluid by closing one or more valves in fluid communication with the recycle loop, and wherein, in a first operating mode, the thermal management fluid is cooled by the first but not the second thermal management unit and, in a different second operating mode, the thermal management fluid is cooled by the second but not the first thermal management unit.

2. The charging system of claim 1, wherein the thermal management fluid is a gas or liquid, wherein the second thermal management unit decreases the operating temperature of the energy storage unit during charging by the external power source, wherein the energy storage unit is a battery pack, wherein the energy storage unit-related parameter is one or more of C- and E-rates for the battery pack, stored energy capacity or nominal capacity, energy or nominal energy (Wh for a specific C-rate), cycle life (number for a specific DOD), specific energy, specific power, energy density, power density, maximum continuous discharge current, maximum 30-second discharge pulse current, charge voltage, float voltage, (recommended) charge current, internal resistance, terminal voltage, winding temperature, battery pack voltage level, output electrical current, leakage current, internal battery pack temperature, depth-of-charge, state-of-charge, or state-of-health, and state-of-function, and wherein the thermal management fluid passes through a heat exchanger of the first thermal management unit.

3. The charging system of claim 1, wherein the second thermal management unit lowers, by heat transfer to the thermal management fluid, the operating temperature of the energy storage unit during charging, wherein the second thermal management unit comprises one or more of a direct, indirect, or multi-stage evaporative cooler, vapor-compression cycle refrigeration cycle device acoustic cooling device, magnetic cooling device, pulse type cooling device, Sterling cycle cooling device, thermoelectric cooling or thermionic cooling device, vortex tube cooling device, and water cycle cooling device, and wherein a heat exchange medium removes heat from the thermal management fluid via a heat exchanger.

4. The charging system of claim 1, wherein the thermal management fluid is a gas or liquid, wherein the second thermal management unit decreases the operating temperature of the energy storage unit during charging by the external power source, wherein the energy storage unit is a battery pack, wherein the energy storage unit-related parameter is one or more of C- and E-rates for the battery pack, stored energy capacity or nominal capacity, energy or nominal energy (Wh for a specific C-rate), cycle life (number for a specific DOD), specific energy, specific power, energy density, power density, maximum continuous discharge current, maximum 30-second discharge pulse current, charge voltage, float voltage, (recommended) charge current, internal resistance, terminal voltage, winding temperature, battery pack voltage level, output electrical current, leakage current, internal battery pack temperature, depth-of-charge, state-of-charge, or state-of-health, and state-of-function, and wherein the thermal management fluid passes through the recycle loop.

5. The charging system of claim 4, wherein the thermal management fluid is a liquid, the liquid comprising ethylene glycol.

6. The charging system of claim 4, wherein the thermal management fluid removes thermal energy from the energy storage unit and wherein the heated thermal management fluid has a first portion of the removed thermal energy removed by the second thermal management unit, and a second portion of the removed thermal energy removed by the first thermal management unit followed by recycle of the cooled thermal management fluid to the energy storage unit.

7. The charging system of claim 1, wherein the second thermal management unit removably attaches to and detaches from the at least part of the first thermal management unit or a thermal management fluid recycle loop and wherein the first or second thermal management unit comprises a mechanism to remove gas bubbles from the thermal management fluid introduced by attachment of the second thermal energy unit.

8. A method comprising:
electrically connecting an external power source to a rechargeable electric vehicle comprising an interior and exterior, the interior comprising a rechargeable energy storage unit in electrical communication with one or more electric motors to propel the electric vehicle and a receptacle to receive electrical energy to recharge the energy storage unit, and a first thermal management unit to control an operating temperature of the energy storage unit, wherein the external power source, after electrical connection, is in electrical communication, by the receptacle, with the energy storage unit; and
during charging of the energy storage unit by the external power source, passing, by a second thermal management unit located outside the rechargeable electric vehicle exterior and in fluid communication with the energy storage unit, a thermal management fluid through at least part of the energy storage unit to control the energy storage unit temperature, wherein the thermal management fluid passes through at least part of the first thermal management unit or a thermal management fluid recycle loop in fluid communication with the first thermal management unit;
wherein a microprocessor isolates the first thermal management unit from flow of the thermal management fluid by closing one or more valves in fluid communication with the recycle loop, and wherein, in a first operating mode, the thermal management fluid is cooled by the first but not the second thermal management unit and, in a different second operating mode, the thermal management fluid is cooled by the second but not the first thermal management unit.

9. The method of claim 8, wherein the thermal management fluid is a gas or liquid, wherein the second thermal management unit decreases the operating temperature of the energy storage unit during charging by the external power source, wherein the energy storage unit is a battery pack, wherein the energy storage unit-related parameter is one or more of C- and E-rates for the battery pack, stored energy capacity or nominal capacity, energy or nominal energy (Wh for a specific C-rate), cycle life (number for a specific DOD), specific energy, specific power, energy density, power density, maximum continuous discharge current, maximum 30-second discharge pulse current, charge voltage, float voltage, (recommended) charge current, internal resistance, terminal voltage, winding temperature, battery pack voltage level, output electrical current, leakage current, internal battery pack temperature, depth-of-charge, state-of-charge, or state-of-health, and state-of-function, and wherein the thermal management fluid passes through a heat exchanger of the first thermal management unit.

10. The method of claim 8, wherein the second thermal management unit lowers, by heat transfer to the thermal management fluid, the operating temperature of the energy storage unit during charging, wherein the second thermal management unit comprises one or more of a direct, indirect, or multi-stage evaporative cooler, vapor-compression cycle refrigeration cycle device acoustic cooling device, magnetic cooling device, pulse type cooling device, Sterling cycle cooling device, thermoelectric cooling or thermionic cooling device, vortex tube cooling device, and water cycle cooling device, and wherein a heat exchange medium removes heat from the thermal management fluid via a heat exchanger.

11. The method of claim 8, wherein the thermal management fluid is a gas or liquid, wherein the second thermal management unit decreases the operating temperature of the energy storage unit during charging by the external power source, wherein the energy storage unit is a battery pack, wherein the energy storage unit-related parameter is one or more of C- and E-rates for the battery pack, stored energy capacity or nominal capacity, energy or nominal energy (Wh for a specific C-rate), cycle life (number for a specific DOD), specific energy, specific power, energy density, power density, maximum continuous discharge current, maximum 30-second discharge pulse current, charge voltage, float voltage, (recommended) charge current, internal resistance, terminal voltage, winding temperature, battery pack voltage level, output electrical current, leakage current, internal battery pack temperature, depth-of-charge, state-of-charge, or state-of-health, and state-of-function, and wherein the thermal management fluid passes through the recycle loop.

12. The method of claim 11, wherein the thermal management fluid is a liquid, the liquid comprising ethylene glycol.

13. The method of claim 11, wherein the thermal management fluid removes thermal energy from the energy storage unit and wherein the heated thermal management fluid has a first portion of the removed thermal energy removed by the second thermal management unit, and a second portion of the removed thermal energy removed by the first thermal management unit followed by recycle of the cooled thermal management fluid to the energy storage unit.

14. The method of claim 8, wherein the second thermal management unit removably attaches to and detaches from the at least part of the first thermal management unit or a thermal management fluid recycle loop and wherein the first or second thermal management unit comprises a mechanism to remove gas bubbles from the thermal management fluid introduced by attachment of the second thermal energy unit.

* * * * *